US012673443B2

(12) United States Patent
Losego et al.

(10) Patent No.: US 12,673,443 B2
(45) Date of Patent: Jul. 7, 2026

(54) TREATING CELLULOSIC MATERIALS AND METHODS OF MAKING TREATED CELLULOSIC MATERIALS

(71) Applicant: Georgia Tech Research Corporation, Atlanta, GA (US)

(72) Inventors: Mark D. Losego, Atlanta, GA (US); Shawn Alan Gregory, Atlanta, GA (US); Shannon K. Yee, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 947 days.

(21) Appl. No.: 17/800,663

(22) PCT Filed: Feb. 18, 2021

(86) PCT No.: PCT/US2021/018476

§ 371 (c)(1),
(2) Date: Aug. 18, 2022

(87) PCT Pub. No.: WO2021/168049

PCT Pub. Date: Aug. 26, 2021

(65) Prior Publication Data

US 2023/0347547 A1 Nov. 2, 2023

Related U.S. Application Data

(60) Provisional application No. 62/978,866, filed on Feb. 20, 2020.

(51) Int. Cl.

*B27K 3/02* (2006.01)
*B27K 3/15* (2006.01)

(Continued)

(52) U.S. Cl.

CPC ............ *B27K 3/0271* (2013.01); *B27K 3/156* (2013.01); *B27K 3/22* (2013.01); *B27K 3/26* (2013.01); *B27K 3/32* (2013.01); *B27K 2200/10* (2013.01)

(58) Field of Classification Search

CPC ........ B27K 3/0271; B27K 3/156; B27K 3/22; B27K 3/26; B27K 3/32

See application file for complete search history.

(56) References Cited

U.S. PATENT DOCUMENTS 3,527,719 A * 9/1970 Kelley .................. D21H 17/37 524/14
6,491,727 B1 * 12/2002 Rearick .............. D06M 13/432 8/185

(Continued)

FOREIGN PATENT DOCUMENTS

CN 105415477 A * 3/2016 .............. B27N 3/00
JP 2002-519221 * 7/2002 ............ B32B 23/08

(Continued)

OTHER PUBLICATIONS

Hyde, G Kevin, et al., "Atomic Layer Deposition of Titania on Cellulose Acetate for Enhanced Hemostasis". Biotechnol J. Feb. 2011 ; 6(2): 213-223.*

(Continued)

*Primary Examiner* — Bret P Chen

(74) *Attorney, Agent, or Firm* — TROUTMAN PEPPER LOCKE LLP; Ryan A. Schneider; Korbin M. Blunck

(57) ABSTRACT

Methods of modifying properties of a cellulosic material include depositing an additive onto the cellulosic material, the additive being in a vapor phase and configured to modify one or more properties of the cellulosic material and adsorbing the additive into the cellulosic material, wherein the additive reacts with one or more functional groups of the cellulosic material. The depositing can be an atomic layer (Continued)

deposition of the additive onto the cellulosic material. The additive can be configured to react with a nucleophile in the cellulosic material. One or more properties of the cellulosic material can include hydrophobicity, thermal conductivity, thermal diffusivity, fungo-toxicity, toxicity, wettability, tensile strength, corrosiveness, biodegradability, bio-toxicity, or swelling.

19 Claims, 22 Drawing Sheets

(51) Int. Cl.

| | |
|---|---|
| ***B27K 3/22*** | (2006.01) |
| ***B27K 3/26*** | (2006.01) |
| ***B27K 3/32*** | (2006.01) |

(56) References Cited

U.S. PATENT DOCUMENTS

| | | | | |
|---|---|---|---|---|
| 7,919,025 | B2 | 4/2011 | Ramaswamy et al. | |
| 8,771,480 | B2 | 7/2014 | Medoff | |
| 9,375,678 | B2 * | 6/2016 | Nair | B01D 69/148 |
| 2004/0224588 | A1 | 11/2004 | Cook et al. | |
| 2011/0223401 | A1 * | 9/2011 | Harlin | C23C 16/45555<br>427/250 |
| 2016/0088756 | A1 | 3/2016 | Ramadas | |
| 2018/0151345 | A1 * | 5/2018 | Haukka | H01L 21/02178 |

FOREIGN PATENT DOCUMENTS

| | | | | |
|---|---|---|---|---|
| WO | WO 2008/110456 | * | 9/2008 | D21C 5/00 |
| WO | WO 2016/040762 A1 | * | 3/2016 | C08B 11/00 |

OTHER PUBLICATIONS

English translation of CN 105415477 A.*

Hokkanen, Sanna, et al., "A review on modification methods to cellulose-based adsorbents to improve adsorption capacity". Water Research, vol. 91, Mar. 15, 2016, pp. 156-173.*

Alila, Sabrine, et al., "Adsorption of a Cationic Surfactant onto Cellulosic Fibers I. Surface Charge Effects". Langmuir 2005, 21, 8106 -8113.*

International Search Report and Written Opinion from Application No. PCT/US2021/18476 dated Jun. 8, 2021.

Gregory, et al., "Single-Cycle Atomic Layer Deposition on Bulk Wood Lumber for Managing Moisture Content, Mold Growth, and Thermal Conductivity," Langmuir, vol. 36, No. 7, Feb. 13, 2020 pp. 1633-1641.

* cited by examiner

Diffusion Limited Process (TMA, DEZ)

TREATING CELLULOSIC MATERIALS AND METHODS OF MAKING TREATED CELLULOSIC MATERIALS

CROSS-REFERENCE TO RELATED APPLICATIONS

This application is a § 371 National Stage of International Patent Application No. PCT/US2021/018476, with an international filing date of 18 Feb. 2021, which International Patent Application No. PCT/US2021/018476 claims priority to U.S. Provisional Application No. 62/978,866, filed 20 Feb. 2020, each of which is hereby incorporated by reference in its entirety as if fully set forth below.

FIELD OF THE DISCLOSURE

The present disclosure relates generally to treated cellulosic materials. Particularly, embodiments of the present disclosure relate to methods and processes for treating cellulosic materials with additives.

BACKGROUND

Wood is a universal building material. Wood lumber is ubiquitous as a modern construction material because it is renewable, abundant, low cost, and shows good structural integrity. While highly versatile, many of its properties vary with water content (e.g., dimensionality, mechanical strength, and thermal insulation, among others). Further engineering of lumber is desired. For example, wood studs can be the primary thermal conduction mechanisms in the walls of a built environment. Moisture uptake significantly influences lumber's properties and physical dimensions. For example, pine lumber's volume and thermal conductivity both increase by about 20% with a moisture uptake of about 12% by weight.

Therefore, much effort is placed on re-engineering lumber-based (and other cellulosic) building materials to optimize their properties, such as thermal insulation, density, and mechanical moduli. Treatments to control the water content in wood have many technological applications. Low-temperature, low-pressure, or vapor phase treatments can be used to modify the surface chemistry of temperature sensitive materials including soft goods and natural (cellulosic) products.

What is needed, therefore, are methods for modifying the properties of cellulosic materials to improve the usefulness of such materials. Embodiments of the present disclosure address this need as well as other needs that will become apparent upon reading the description below in conjunction with the drawings.

BRIEF SUMMARY OF THE DISCLOSURE

The present disclosure relates generally to treated cellulosic materials. Particularly, embodiments of the present disclosure relate to methods and processes for treating cellulosic materials with additives.

An exemplary embodiment of the present disclosure can provide a method of modifying properties of a cellulosic material, the method comprising: permeating an additive into the cellulosic material, the additive being in a vapor phase and configured to modify one or more properties of the cellulosic material; and adsorbing the additive into the cellulosic material, wherein the additive reacts with one or more functional groups of the cellulosic material.

In any of the embodiments disclosed herein, the permeating can comprise an atomic layer deposition of the additive onto the cellulosic material.

In any of the embodiments disclosed herein, the atomic layer deposition can comprise from 1 to 50 deposition cycles.

In any of the embodiments disclosed herein, the atomic layer deposition can comprise from 1 to 10 deposition cycles.

In any of the embodiments disclosed herein, the additive can be configured to react with a nucleophile in the cellulosic material.

In any of the embodiments disclosed herein, the additive can be reaction limited in the cellulosic material.

In any of the embodiments disclosed herein, the one or more properties of the cellulosic material can include: hydrophobicity, thermal conductivity, thermal diffusivity, fango-toxicity, toxicity, wettability, tensile strength, biodegradability, bio-toxicity, corrosiveness, or swelling.

In any of the embodiments disclosed herein, the cellulosic material can be one or more of: wood lumber, engineered wood product, natural wood products, plastic lumber, engineered composites, plywood, sawdust board, particle board, sawdust, wood chips, wood strands, hardwood, or softwood.

In any of the embodiments disclosed herein, the additive can comprise a metal oxide.

Also disclosed herein is a treated cellulosic material made by the method of any of the embodiments disclosed herein.

Another embodiment of the present disclosure can provide another method of modifying properties of a cellulosic material, the method comprising: permeating a first additive into the cellulosic material, the first additive being in a vapor phase and configured to modify one or more properties of the cellulosic material; adsorbing the additive into one or more of a plurality of capillaries in the cellulosic material, wherein the additive reacts with one or more functional groups of the cellulosic material; and permeating a second additive into the cellulosic material, the second additive being in a vapor phase and configured to create a chemical barrier over the plurality of capillaries by adsorbing onto one or more functional groups of the cellulosic material.

In any of the embodiments disclosed herein, permeating the first additive onto the cellulosic material and permeating the second additive onto the cellulosic material can comprise an atomic layer deposition of the first additive and the second additive onto the cellulosic material, respectively.

In any of the embodiments disclosed herein, the atomic layer deposition can comprise from 1 to 50 deposition cycles.

In any of the embodiments disclosed herein, the atomic layer deposition can comprise from 1 to 10 deposition cycles.

In any of the embodiments disclosed herein, at least one of the first additive and the second additive can be configured to react with a nucleophile in the cellulosic material.

In any of the embodiments disclosed herein, at least one of the first additive and the second additive can be reaction limited in the cellulosic material.

In any of the embodiments disclosed herein, the one or more properties of the cellulosic material can include: hydrophobicity, thermal conductivity, thermal diffusivity, fango-toxicity, toxicity, wettability, tensile strength, biodegradability, bio-toxicity, corrosiveness, or swelling.

In any of the embodiments disclosed herein, the cellulosic material can be one or more of: wood lumber, engineered wood product, natural wood products, plastic lumber, engineered composites, plywood, sawdust board, particle board, sawdust, wood chips, wood strands, hardwood, or softwood.

In any of the embodiments disclosed herein, the additive can comprise a metal oxide.

In any of the embodiments disclosed herein, the second additive can comprise an oligomer.

Also disclosed herein is a treated cellulosic material made by the method of any of the embodiments disclosed herein.

Another embodiment of the present disclosure can provide a treated cellulosic material, comprising: a cellulose base; a plurality of capillaries formed by the cellulose base; one or more functional groups within the cellulose base comprising nucleophiles; a first atomic layer comprising a first additive, the first atomic layer being deposited on the surface of and/or adsorbed in each of the plurality of capillaries, the first additive being configured to (i) react with the one or more functional groups and (ii) alter a property of the cellulose base; and a second atomic layer comprising a second additive, the second atomic layer being adsorbed onto the surface of the cellulose base such that the second atomic layer creates a chemical barrier over each of the capillaries.

Another embodiment of the present disclosure can provide a method of treating a cellulosic material, comprising: permeating a first additive into the cellulosic material, the first additive being in a vapor phase and configured to modify one or more properties of the cellulosic material; adsorbing the additive into a plurality of capillaries of the cellulosic material, wherein the additive reacts with one or more functional groups of the cellulosic material; and permeating a second additive into the cellulosic material, the second additive being in a vapor phase and configured to seal the first additive inside the plurality of capillaries, wherein the second additive seals the plurality of capillaries by adsorbing onto one or more functional groups of the cellulosic material.

Also disclosed herein is a treated cellulosic material made according to any of the embodiments disclosed herein.

These and other aspects of the present disclosure are described in the Detailed Description below and the accompanying figures. Other aspects and features of embodiments of the present disclosure will become apparent to those of ordinary skill in the art upon reviewing the following description of specific, exemplary embodiments of the present invention in concert with the figures. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
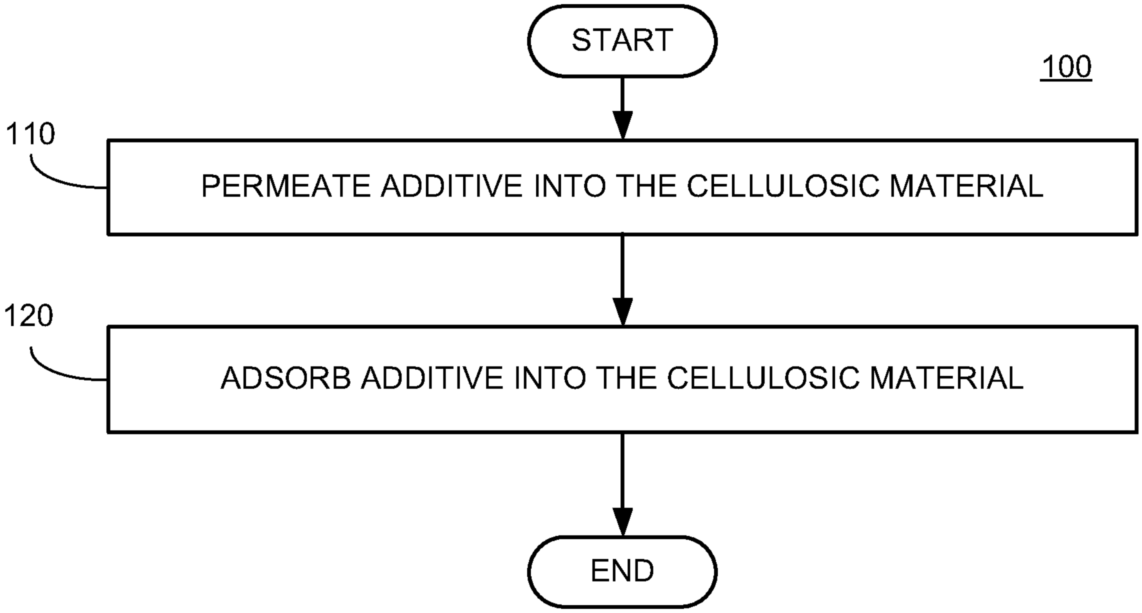
FIG. 1 illustrates a flowchart of a method of modifying properties of a cellulosic material, in accordance with some embodiments of the present disclosure.

As stated above, a problem with currently cellulosic materials is that their properties vary wildly with small changes in environment, such as water content. In order for cellulosic materials to continually be ubiquitous as modern construction materials, cellulosic materials must be further engineered to ensure their renewability, abundancy, low cost, and structural integrity. For instance, moisture uptake significantly influencers wood lumber's properties and physical dimensions. Much effort is placed on re-engineering lumber-based building materials to optimize thermal insulation, density, and mechanical modulus, among other properties.

Low-temperature, low-pressure, vapor phase treatments can be used to modify the surface chemistry of temperature sensitive materials including soft goods and natural products. A number of vapor modification schemes can be applied to polymeric materials including atomic layer deposition (ALD), vapor phase infiltration (VPI), sequential infiltration synthesis (SIS), and initiated chemical vapor deposition (iCVD). Because gases can rapidly permeate complex geometries, these approaches often provide conformal modification of even intricate polymeric structures like photoresists, fabrics, membranes, and foams. The chemistry between common ALD precursors and common synthetic polymers (such as poly(amides), poly(esters), poly (methacrylates)) can create novel material properties. Similarly, ALD on natural polymers, such as cellulose, can improve the strength of cellulosic fibers, enable wearable sensors, and make cotton a selective sorbent for oil spill remediation.

Disclosed herein is an unusual approach for modifying bulk lumber: atomic layer deposition (ALD). ALD is a subset of chemical vapor deposition that typically can comprise repeating a two-step cycle at low pressures. In the first step, a single chemical vapor (usually a metalorganic) can be viscously flowed over a surface and permitted to react in a self-limiting fashion. In the second step, a second chemical vapor (often a nucleophilic oxidant) can be viscously flowed over the surface and permitted to react with the layer deposited in the first step, also in a self-limiting fashion. The functional group present on the surface at the end of the second step can be reactive towards the chemical vapor used in the first step, thereby enabling repetition of the process to achieve "atomic-level" precision in film thickness. While ALD is often thought of as a lower-volume process for microelectronics, single exposure ALD processes could possibly scale to commodity goods manufacturing without a need for complicated engineering solutions. For wood-based products, a single-cycle ALD process can be engineered similarly to current pressure treatments that are carried out in high pressure or vacuum chambers.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 illustrates a method 100 of modifying properties of a cellulosic material. The cellulosic material can be wood lumber, engineered wood product, natural wood products, plastic lumber, engineered composites, and the like. Suitable examples of wood lumber can include, but are not limited to, hardwood, softwood, aspen, balsa, beech, birch, mahogany, hickory, maple, oak, teak, *eucalyptus*, pine, fir, cedar, juniper, spruce, redwood, or any combination thereof. It is understood that any other known sources of wood lumber may be used. Suitable examples of engineered composites can include, but are not limited to, oriented strand board (OSB), plywood, sawdust board particle board, or any combination thereof.

It is understood that other examples of cellulosic material can be used herein with the present disclosure. For example, the cellulosic material can be a non-wood cellulosic material, such as barley, bagasse, bamboo, wheat, flax, hemp, kenaf, *Arundo donax*, corn stalk, jute, ramie, cotton, wool, rye, rice, *papyrus*, esparto, sisal, grass, abaca, or a combination thereof.

In block 110, an additive can be permeated into the cellulosic material. The additive can be in a vapor phase; however, it is understood that the additive can be permeated in other phases, such as plasma, gaseous, liquid, or mixed phase. The permeating in block 110 can comprise an atomic layer deposition (ALD) of the additive onto the cellulosic material. The ALD can comprise from 1 deposition cycle to 50 deposition cycles (e.g., from 1 to 49, from 1 to 48, from 1 to 47, from 1 to 46, from 1 to 45, from 1 to 44, from 1 to 43, from 1 to 42, from 1 to 41, from 1 to 40, from 1 to 39, from 1 to 38, from 1 to 37, from 1 to 36, from 1 to 35, from 1 to 34, from 1 to 33, from 1 to 32, from 1 to 31, from 1 to 30, from 1 to 29, from 1 to 28, from 1 to 27, from 1 to 26, from 1 to 25, from 1 to 24, from 1 to 23, from 1 to 22, from 1 to 21, from 1 to 20, from 1 to 19, from 1 to 18, from 1 to 17, from 1 to 16, from 1 to 15, from 1 to 14, from 1 to 13, from 1 to 12, from 1 to 11, from 1 to 10 cycles, from 1 to 9 cycles, from 1 to 8 cycles, from 1 to 7 cycles, from 1 to 6 cycles, from 1 to 5 cycles, from 1 to 4 cycles, from 1 to 3 cycles, or from 1 to 2 cycles).

ALD occurs via a binary sequence of self-limiting surface reactions that enable exquisite control over film thickness and conformality. First, a precursor (often a metalorganic) chemically binds to reactive surface sites. The bound precursor does not self-react, thereby permitting only a single monolayer of deposition. Then a co-reactant is introduced to either oxidize or reduce the precursor and re-activate the surface for precursor binding. Between cycles, an inert purge is used to evacuate all but the chemisorbed species, encouraging self-termination of the half-reaction. Each cycle deposits about 1 Å of material. Many of these surface reactions occur below 200° C., making ALD compatible with organic and polymeric species.

The additive can be selected to confer one or more desired properties to the cellulosic material, or the additive can be selected to alter one or more properties of the cellulosic material. Suitable examples of properties that the additive can be selected to alter can include, but are not limited to, hydrophobicity, thermal conductivity, thermal diffusivity, fungo-toxicity, toxicity, wettability, tensile strength, corrosiveness, or swelling. For example, the additive can comprise a metal oxide and/or a metal hydroxide, though it is understood that the additive can comprise any material or chemical compound depending on the property of the cellulosic material that is desired to be altered. Suitable examples of a metal oxide can include, but are not limited to, aluminum oxide, titanium oxide, zinc oxide, hafnium oxide, cerium oxide, silicon oxide, indium oxide, silver oxide, copper oxide, nickel oxide, iron oxide, manganese oxide, niobium oxide, tantalum oxide, magnesium oxide, calcium oxide, strontium oxide, and oxides of the lanthanide metals. The additive can also comprise any combination of the above-mentioned examples, such as a binary mixture, ternary mixture, and/or a quaternary mixture.

The additive can also include a mixture of one or more chemical compounds. The additive can also comprise metals, organics, metal hydroxides, as well as metal oxides as described above. Suitable examples of organics can include, but are not limited to, alkanes, alkenes, aryls, any hydrophobic organics, long-chain organics, and any other organics that are not overly reactive with the cellulosic material, for reasons outlined below.

The additive, when permeated, can react with a nucleophile in the cellulosic material. In such a manner, the additive can be reaction limited in the cellulosic material, rather than diffusion limited. In other words, any overly reactive additive might be diffusion limited rather than reaction limited. Though a reaction limited additive is desirable, the additive can comprise multiple compounds or components, only some of which can be reaction limited. That is to say, any and all components and/or compounds in the additive need not be reaction limited.

Using reaction limited processes, chemical precursors can permeate more deeply into a porous structure. Reaction-limited processes are achieved by selecting precursors that are less reactive towards the functional groups of the cellulosic material. Alternatively, or additionally, the additive can be pushed into the cellulosic material by an inert gas via a convective flow mechanism. This inert gas can be added at a high pressure to help the additive permeate into the cellulosic material before reacting. In such a manner, the inert gas can help to compensate for diffusion-limited reagents during the permeation step. The method 100 can then proceed on to block 120.

In block 120, the additive can be adsorbed into the cellulosic material, wherein the additive can react with one more functional groups of the cellulosic material. Without wishing to be bound by any one particular scientific theory, this can be aided by the additive being reaction limited rather than diffusion limited. In such a manner, the additive can adsorb into the cellulosic material to react with the one or more functional groups. The method 100 can then terminate after block 120. However, in some embodiments, the method 100 can proceed on to other method steps not shown.

Figure 2:
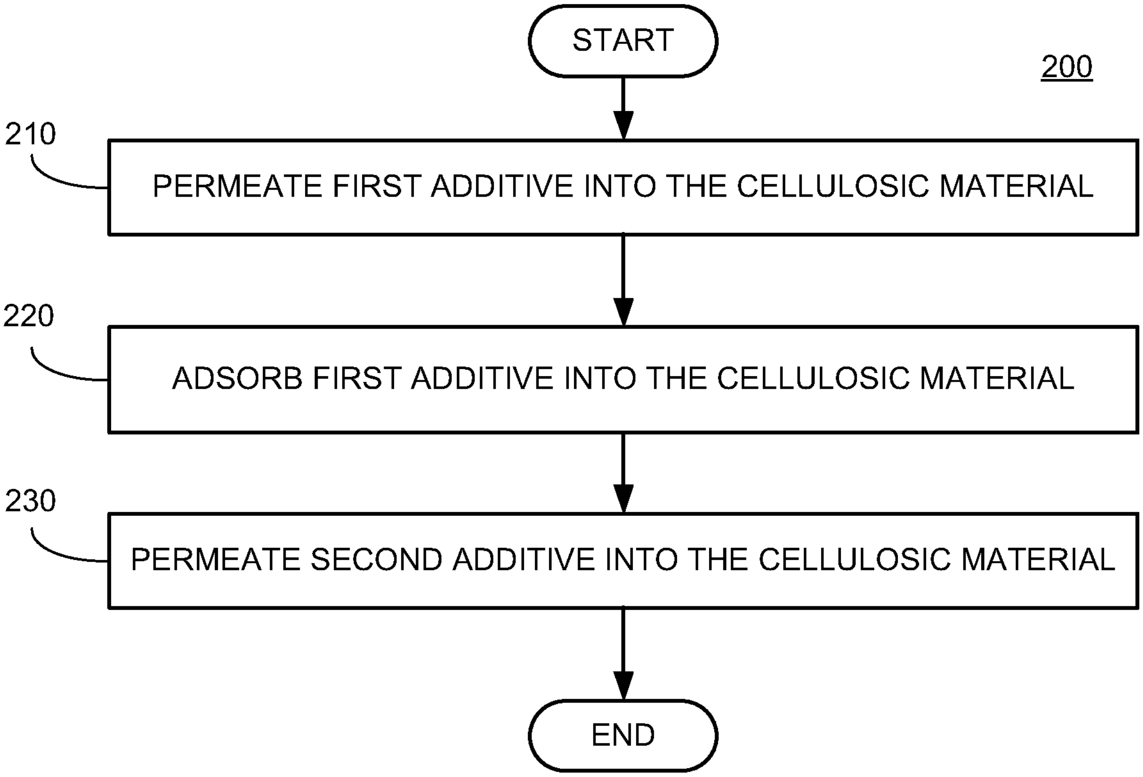
FIG. 2 illustrates a flowchart of another method of modifying properties of a cellulosic material, in accordance with some embodiments of the present disclosure.

FIG. 2 illustrates another method 200 of modifying properties of a cellulosic material. The cellulosic material can be wood lumber, engineered wood product, natural wood products, plastic lumber, engineered composites, and the like. Suitable examples of wood lumber can include, but are not limited to, hardwood, softwood, aspen, balsa, beech, birch, mahogany, hickory, maple, oak, teak, *eucalyptus*, pine, fir, cedar, juniper, spruce, redwood, or any combination thereof. It is understood that any other known sources of wood lumber may be used. Suitable examples of engineered composites can include, but are not limited to, oriented strand board (OSB), plywood, sawdust board particle board, or any combination thereof. The cellulosic material can also comprise wood material precursors. Suitable of wood material precursors can include, but are not limited to, sawdust, wood chips, wood strands, wood shavings, wood pellets, wood filler, any combinations thereof, and the like.

It is understood that other examples of cellulosic material can be used herein with the present disclosure. For example, the cellulosic material can be a non-wood cellulosic material, such as barley, bagasse, bamboo, wheat, flax, hemp, kenaf, *Arundo donax*, corn stalk, jute, ramie, cotton, wool, rye, rice, *papyrus*, esparto, sisal, grass, abaca, or a combination thereof.

In block 210, a first additive can be permeated into the cellulosic material. The first additive can be an additive as described above in the method 100. The first additive can be in a vapor phase; however, it is understood that the first additive can be permeated in other phases, such as plasma, gaseous, liquid, or mixed phase. The permeating in block 210 can comprise an atomic layer deposition (ALD) of the additive onto the cellulosic material. The ALD can comprise from 1 deposition cycle to 50 deposition cycles (e.g., from 1 to 49, from 1 to 48, from 1 to 47, from 1 to 46, from 1 to 45, from 1 to 44, from 1 to 43, from 1 to 42, from 1 to 41, from 1 to 40, from 1 to 39, from 1 to 38, from 1 to 37, from 1 to 36, from 1 to 35, from 1 to 34, from 1 to 33, from 1 to 32, from 1 to 31, from 1 to 30, from 1 to 29, from 1 to 28, from 1 to 27, from 1 to 26, from 1 to 25, from 1 to 24, from 1 to 23, from 1 to 22, from 1 to 21, from 1 to 20, from 1 to 19, from 1 to 18, from 1 to 17, from 1 to 16, from 1 to 15, from 1 to 14, from 1 to 13, from 1 to 12, from 1 to 11, from 1 to 10 cycles, from 1 to 9 cycles, from 1 to 8 cycles, from 1 to 7 cycles, from 1 to 6 cycles, from 1 to 5 cycles, from 1 to 4 cycles, from 1 to 3 cycles, or from 1 to 2 cycles). The method 200 can then proceed on to block 220.

ALD occurs via a binary sequence of self-limiting surface reactions that enable exquisite control over film thickness and conformality. First, a precursor (often a metalorganic) chemically binds to reactive surface sites. The bound precursor does not self-react, thereby permitting only a single monolayer of deposition. Then a co-reactant is introduced to either oxidize or reduce the precursor and re-activate the surface for precursor binding. Between cycles, an inert purge is used to evacuate all but the chemisorbed species, encouraging self-termination of the half-reaction. Each cycle deposits about 1 Å of material. Many of these surface reactions occur below 200° C., making ALD compatible with organic and polymeric species.

In block 220, the first additive can be adsorbed into the cellulosic material, wherein the first additive be adsorbed into a plurality of capillaries in the cellulosic material, wherein the first additive can react with one more functional groups of the cellulosic material. Without wishing to be bound by any one particular scientific theory, the diffusion of the first additive into the plurality of capillaries can be aided by the additive being reaction limited rather than diffusion limited. In such a manner, the first additive can adsorb into the capillaries to react with the one or more functional groups. Using reaction limited processes, chemical precursors can permeate more deeply into a porous structure. Reaction-limited processes are achieved by selecting precursors that are less reactive towards the functional groups of the cellulosic material. The method 200 can then proceed on to block 230.

In block 230, a second additive can be permeated into the cellulosic material. The second additive can be in a vapor phase; however, it is understood that the second additive can be permeated in other phases, such as plasma, gaseous, liquid, or mixed phase. The depositing in block 230 can comprise an atomic layer deposition (ALD) of the second additive onto the cellulosic material. The ALD can comprise from 1 deposition cycle to 50 deposition cycles (e.g., from 1 to 49, from 1 to 48, from 1 to 47, from 1 to 46, from 1 to 45, from 1 to 44, from 1 to 43, from 1 to 42, from 1 to 41, from 1 to 40, from 1 to 39, from 1 to 38, from 1 to 37, from 1 to 36, from 1 to 35, from 1 to 34, from 1 to 33, from 1 to 32, from 1 to 31, from 1 to 30, from 1 to 29, from 1 to 28, from 1 to 27, from 1 to 26, from 1 to 25, from 1 to 24, from 1 to 23, from 1 to 22, from 1 to 21, from 1 to 20, from 1 to 19, from 1 to 18, from 1 to 17, from 1 to 16, from 1 to 15, from 1 to 14, from 1 to 13, from 1 to 12, from 1 to 11, or from 1 to 10 cycles, from 1 to 9 cycles, from 1 to 8 cycles, from 1 to 7 cycles, from 1 to 6 cycles, from 1 to 5 cycles, from 1 to 4 cycles, from 1 to 3 cycles, or from 1 to 2 cycles). The deposition cycles of the second additive can be alternating with the deposition cycles of the first additive, or the deposition cycles of the first and second additives can be sequential. That is to say, the method 200 can repeat back to block 210 after each cycle, or the method 200 can complete the deposition cycles in block 210 before moving on and completing the deposition cycles in block 230.

The second additive can be selected to create a chemical barrier and/or a chemical modification over the plurality of capillaries. In such a manner, the second additive can remove the surface wicking effect of the capillaries, ensuring that the first additive within the capillaries can remain therein. The second additive can also be an additive as described above in the method 100. However, the second additive can also comprise a polymer or other hydrophobic material. The second additive can, alternatively or additionally, comprise an oligomer or other such small molecule. Suitable examples of oligomers can include, but are not limited to, alkanes, alkenes, aryls, any hydrophobic organics, long-chain organics, polymers and any other organics that are not overly reactive with the cellulosic material, for reasons outlined below.

Also disclosed herein are treated cellulosic materials made according to the method 100 and/or the method 200. The treated cellulosic materials can comprise a cellulose base, a plurality of capillaries formed within the cellulose base, and one or more functional groups within the cellulose base comprising nucleophiles. The treated cellulosic materials can also comprise a first atomic layer comprising a first additive deposited on the surface of and/or adsorbed in each of the plurality of capillaries. The first additive can be configured to react with the one or more functional groups and alter a property of the cellulose base. The treated cellulosic materials can also comprise a second atomic layer comprising a second additive. The second atomic layer can be adsorbed onto the surface of the cellulose base such that the second atomic layer can create a chemical barrier over each of the capillaries.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

EXAMPLES

Example 1

Bulk lumber manufactured by Claymark (finished boards of pine, poplar, and spruce measuring 0.75×1.5×72 inches) can be purchased from a local hardware store. The lumber can be without stain or pressure treatment. Lumber can be cut into wood blocks measuring 0.75×1.5×0.5 inches using a miter saw. The wood blocks of the same species can be from a single board. Prior to single-cycle ALD, all wood blocks can be pre-dried in a vacuum oven (<10 torr) for 48 hours at 95° C. When not being processed or measured, wood blocks can be stored in a desiccator to prevent moisture reabsorption.

Figure 3:
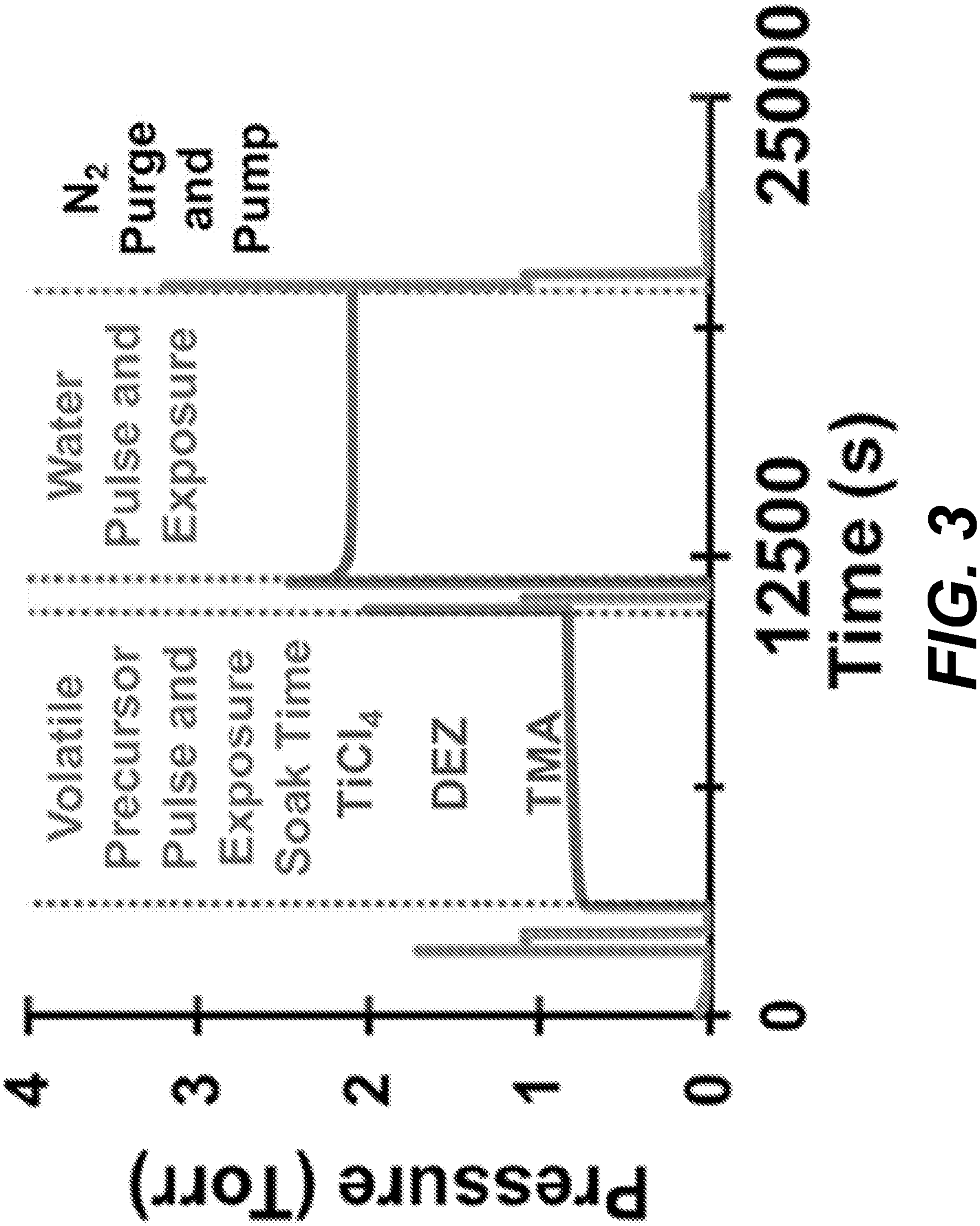
FIG. 3 illustrates a plot of pressure over time for an atomic layer deposition (ALD) in accordance with some embodiments of the present disclosure.

Triplicate blocks of either pine, cedar, or poplar can be ALD coated in a custom-built hot wall vapor phase reactor. Three precursors can be used, among other additives: trimethylaluminum (TMA, Strem Chemicals, 98% purity), diethylzinc (DEZ, Strem Chemicals, 95% purity), and titanium tetrachloride ($TiCl_4$, Strem Chemicals, 99% purity). All treatments can be carried out at 100° C. using at least a single ALD cycle. This 1 cy-ALD process consisted of: 5 minute purge with $N_2$ (99.995+%), 5 minute pump down, 2 minute chamber isolation (ca. $10^{-3}$ Torr), a 3 second precursor pulse directly into the isolated chamber (ca. 0.7 Torr for TMA, 0.7 Torr for DEZ, 0.5 Torr for $TiCl_4$), 15 to 135 minute exposures in a static atmosphere (soak), 5 minute purge, 5 minute pump down, 2 minute isolation, 5 second water pulse (2.5 Torr), 15 to 135 minute soak, 5 minute $N_2$ purge, and 5 minute pump down. A capacitance manometer can be used to record chamber pressure as a function of process time, as shown in FIG. 3.

A Rame-Hart contact angle goniometer can be used to characterize surface wettability before and after ALD coating of the wood blocks. 10 μL water drops can be used for each measurement. Images of the water-wood contact angle can be taken immediately upon drop contact and again after 1 minute of contact and will be described in further detail below. Contact angle was quantified with ImageJ and DropSnake.

To more thoroughly assess water repellency, entire wood blocks can be fully submerged underwater to gravimetrically track water sorption as a function of time. Blocks can be forcibly submerged underwater with a coarse mesh and then periodically withdrawn and weighed. Surface adsorbed water can be gently removed using compressed air before massing. The water sorption capacity (m %) was then calculated via: m %=$(m_t-m_0)/m_0$, where $m_0$ is the block's dry mass prior to submersion and $m_t$ is the block's mass at some submersion time, t.

A hot disk transient plane source (TPS 2500 S) can be used to measure the thermal conductivity, thermal diffusivity, and volumetric heat capacity of the wood blocks before and after ALD coating. This technique conforms to the ISO 22007-2 standard. A symmetric measurement geometry can be employed. Two similarly treated wood blocks can be placed on opposite sides of the transient plane source and held with constant pressure, weighted by ca. 1 kg steel blocks. All thermal measurements can be performed in the same day. Damp blocks can be measured immediately following water submersion.

Figure 4A:
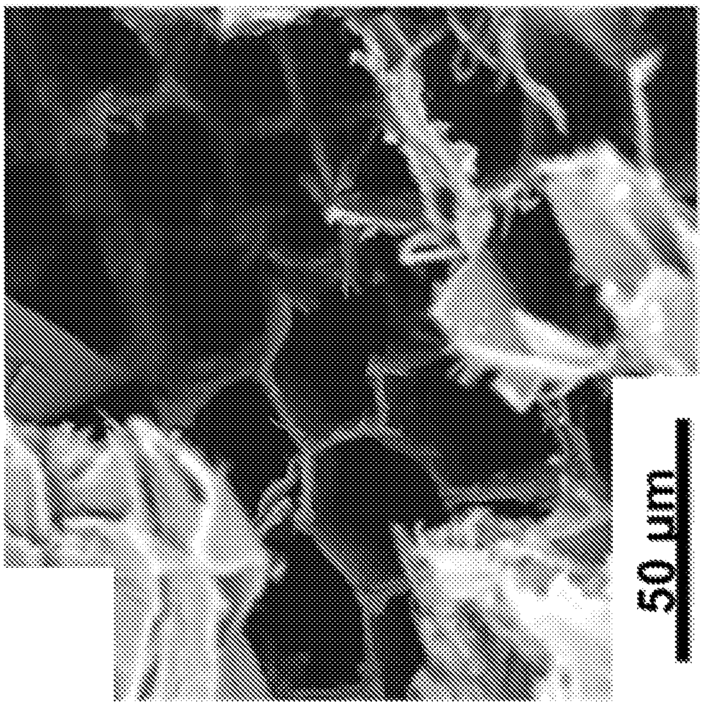
FIGS. 4A and 4B illustrate electron microscope images of the microstructure of a cellulosic material in accordance with some embodiments of the present disclosure.
Figure 4B:
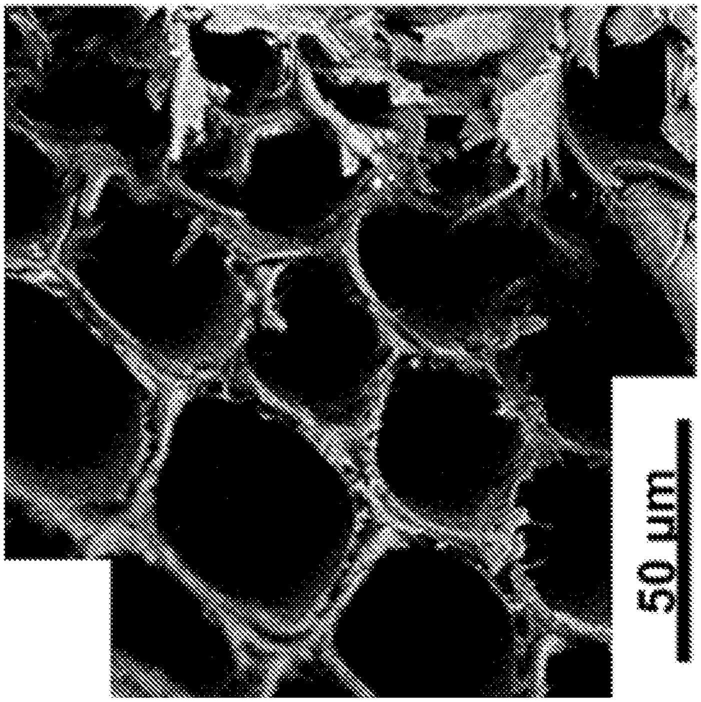
Figure 5A:
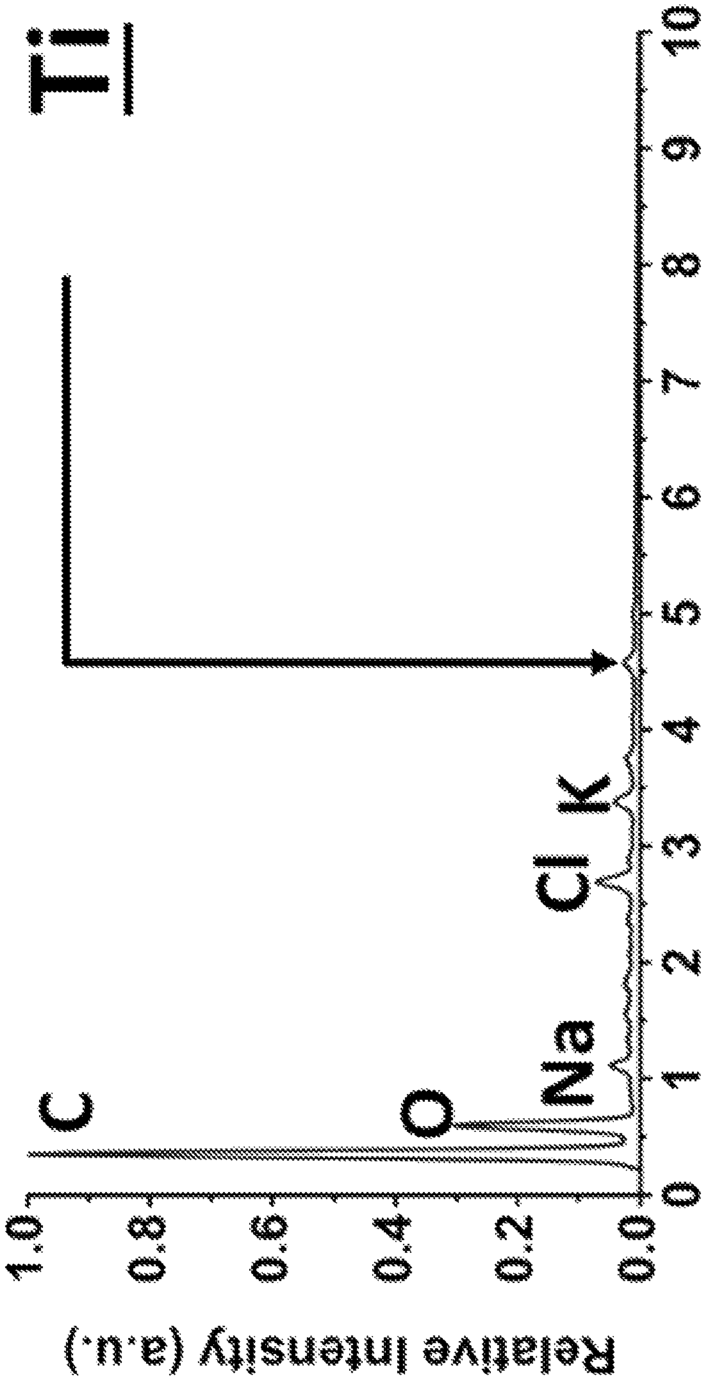
FIGS. 5A, 5B, and 5C illustrate energy-dispersive X-ray (EDX) spectra for a variety of cellulosic materials in accordance with some embodiments of the present disclosure.
Figure 5B:
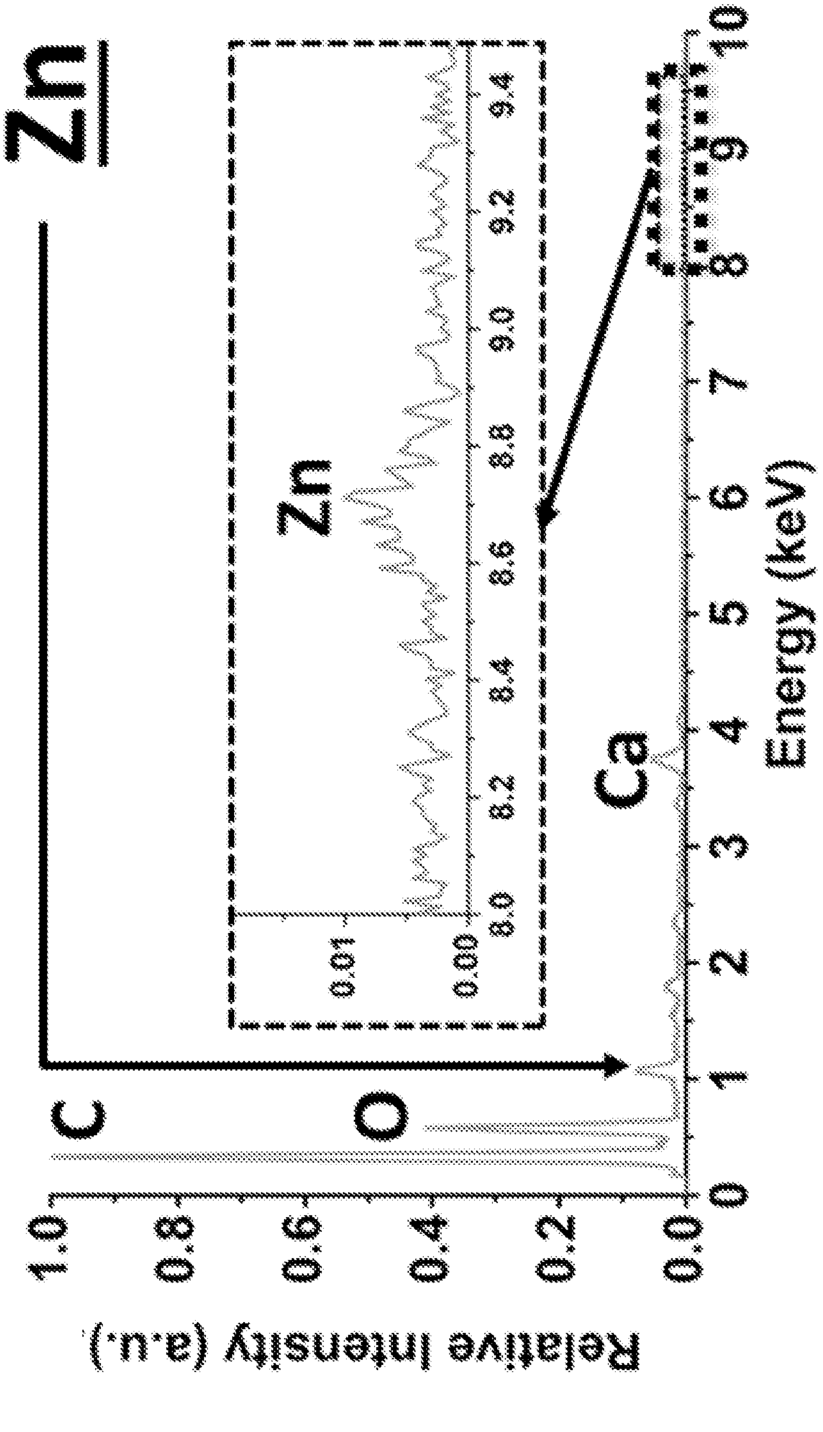
Figure 5C:
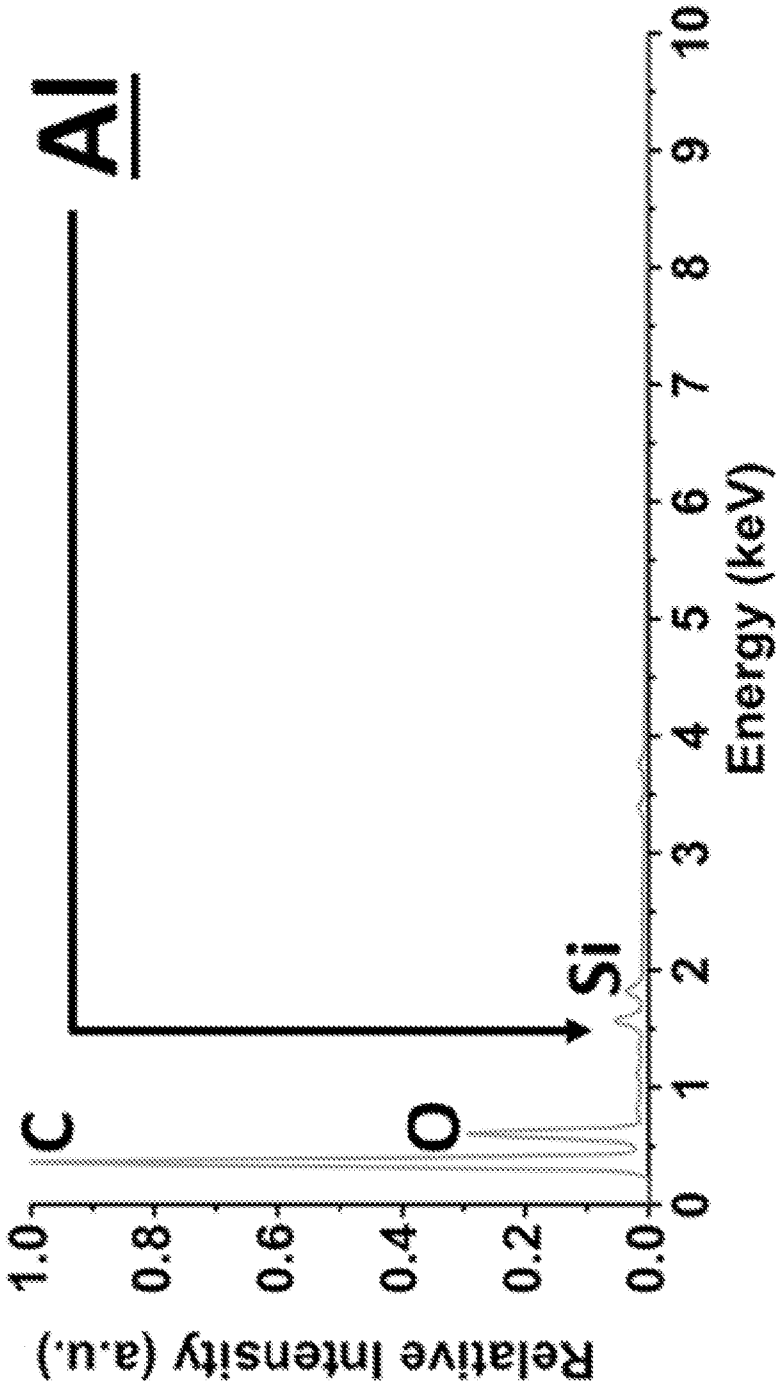

Reacting hydrophilic cellulosic materials with a single ALD cycle of metalorganic or metal halide precursors can oftentimes deposit adventitious carbon and increases surface hydrophobicity. While this hydrophobicity can be often retained up to several (3 to 10) ALD cycles, at high cycle numbers (>10 cycles), the material can return to being hydrophilic. Disclosed herein, at least 1 ALD cycle is explored because of its simplicity and potential for scalability. FIGS. 4A and 4B show a representative electron microscopy image of pine's microstructure before and after a 135-minute $TiCl_4$ 1cy-ALD treatment Immediately evident is that no significant change in microstructure occurs after 1cy-ALD and the high internal porosity is retained. FIGS. 5A, 5B, and 5C show representative EDX spectra for pine blocks exposed to each of the 3 precursors for 135 minutes. Despite using a single ALD exposure, EDX peaks can be detected for the requisite metal in all treatments, presumably because the high internal surface area generates significant metal oxide loading to be detectable by EDX. Interestingly, the $TiCl_4+H_2O$ treated wood blocks show significant residual chlorine, likely due to HCl's reaction with cellulose.

Figure 6:
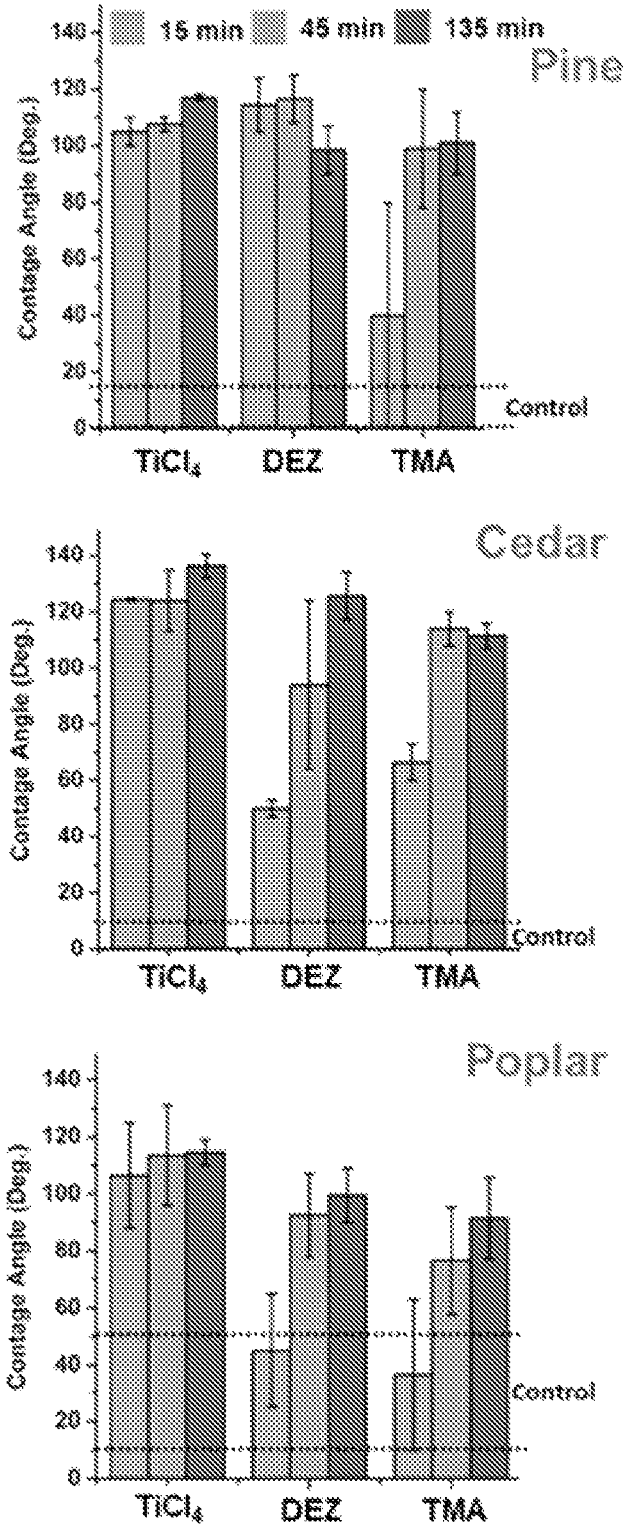
FIG. 6 illustrates the contact angle between water and a variety of cellulosic materials in accordance with some embodiments of the present disclosure.

To evaluate the effects of 1cy-ALD hold times and chemistry on wettability, water contact angle measurements can be collected on the capillary faces of three wood species. FIG. 6 summarizes these contact angle measurements made on pine, cedar, and poplar wood blocks. Black, dotted, horizontal lines indicate the range of contact angles measured for untreated control wood blocks. Each species can be initially hydrophilic ($\theta<50°$) but becomes hydrophobic (>90°) after sufficient vapor exposure time. The initial differences in hydrophilicity amongst untreated lumber species can be likely due to a combination of unique surface roughness, microstructures, and chemistries. Despite these differences, all lumber varieties can show an increase in hydrophobicity after 1cy-ALD treatments, likely due to the metal oxide surface's increased attraction of adventitious carbon, consistent with nominal behavior of other cellulosic materials. In most lumber-precursor combinations tested, surface hydrophobicity can increase with increased exposure time. The TMA-$H_2O$ treatment can illustrate a slower hydrophobic transformation and the lowest contact angles after the 135-minute treatment. $TiCl_4$—$H_2O$ treated lumber can illustrate a greater contact angle across the treatment times and lumber varieties. Without wishing to be bound by any particular scientific theory, these differences in contact angle may be the result of differences in precursor diffusion and reaction rates.

Figure 7A:
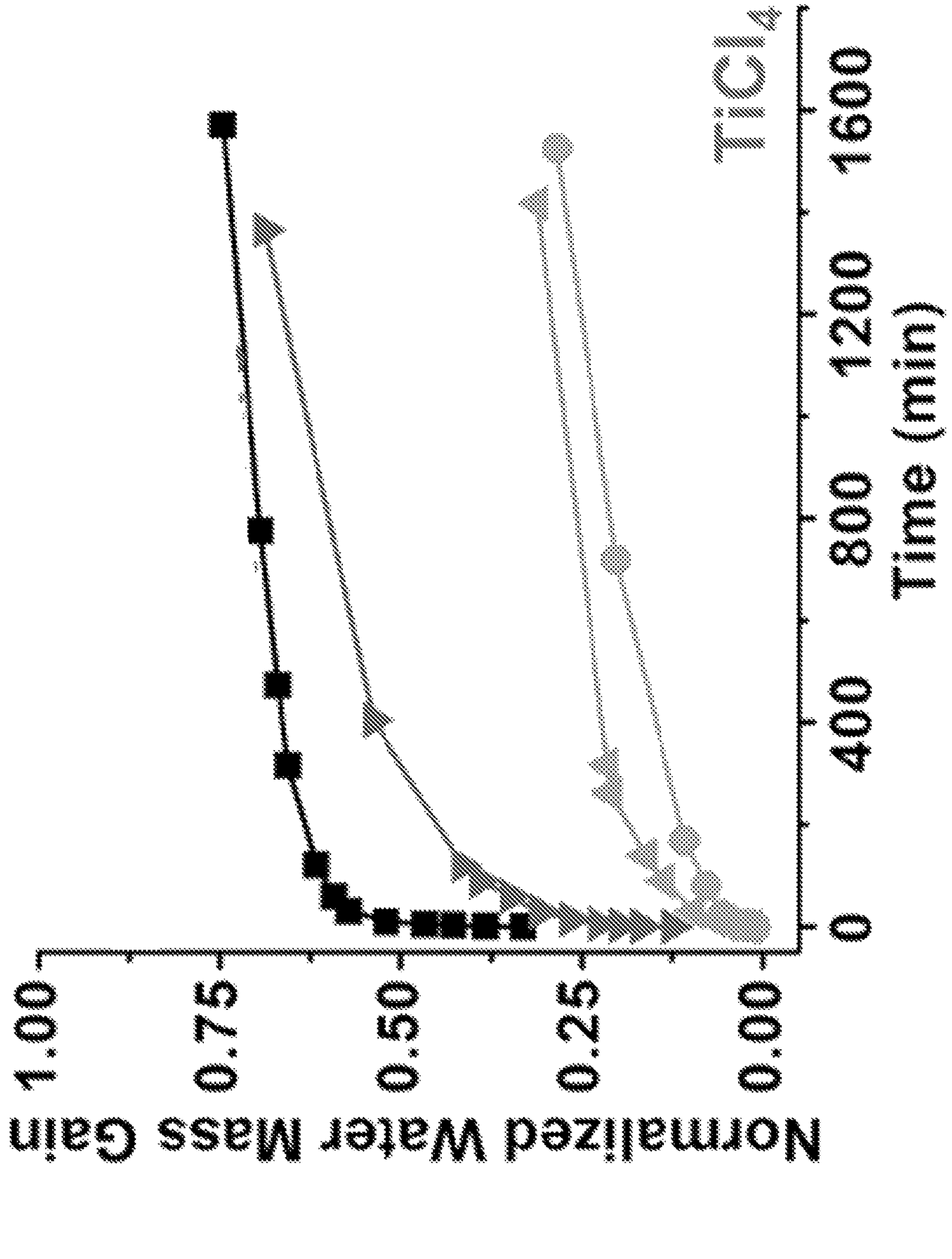
FIGS. 7A, 7B, and 7C illustrate plots of water sorption over time for a cellulosic material with a variety of additives in accordance with some embodiments of the present disclosure.
Figure 7B:
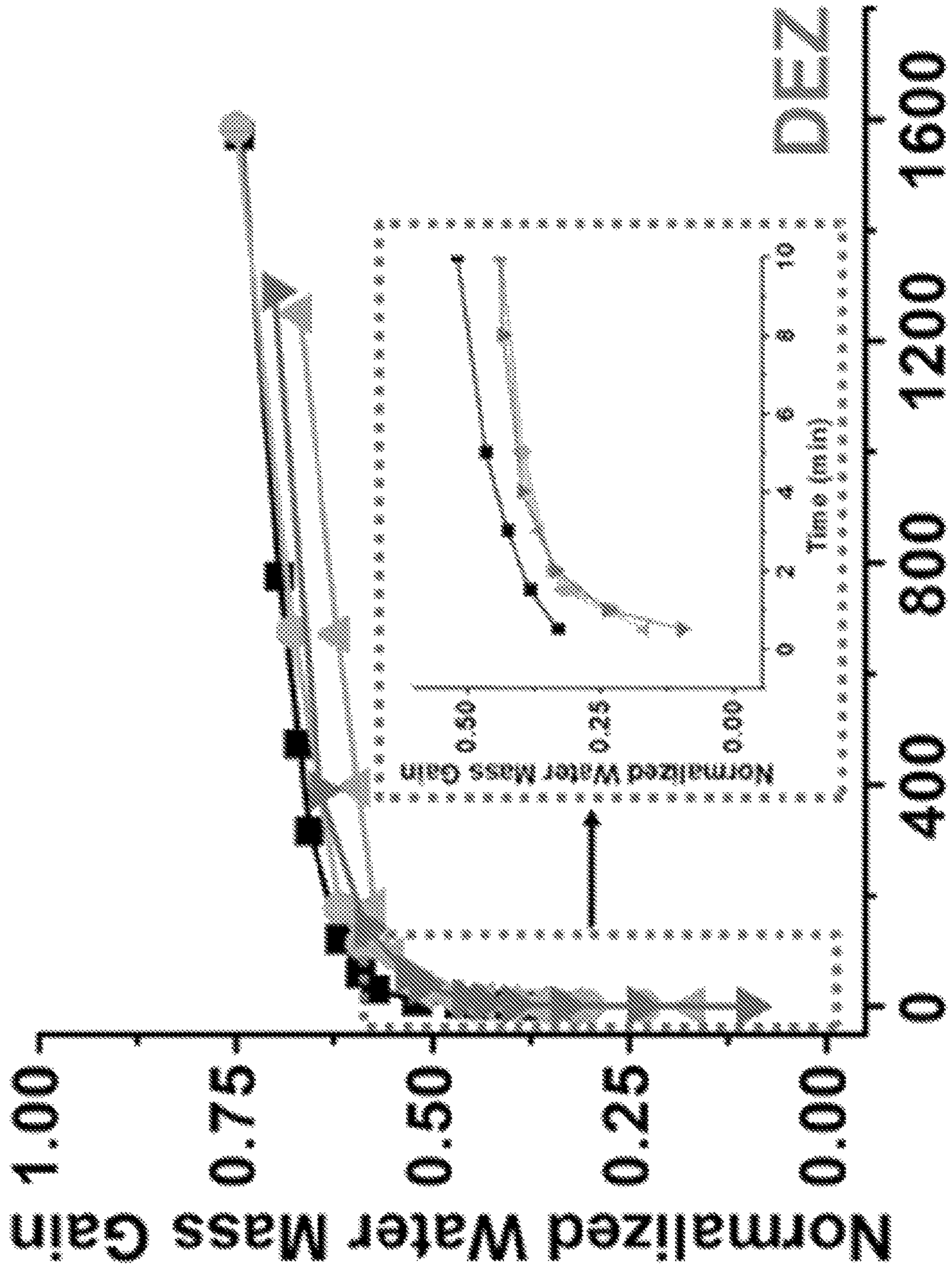
Figure 7C:
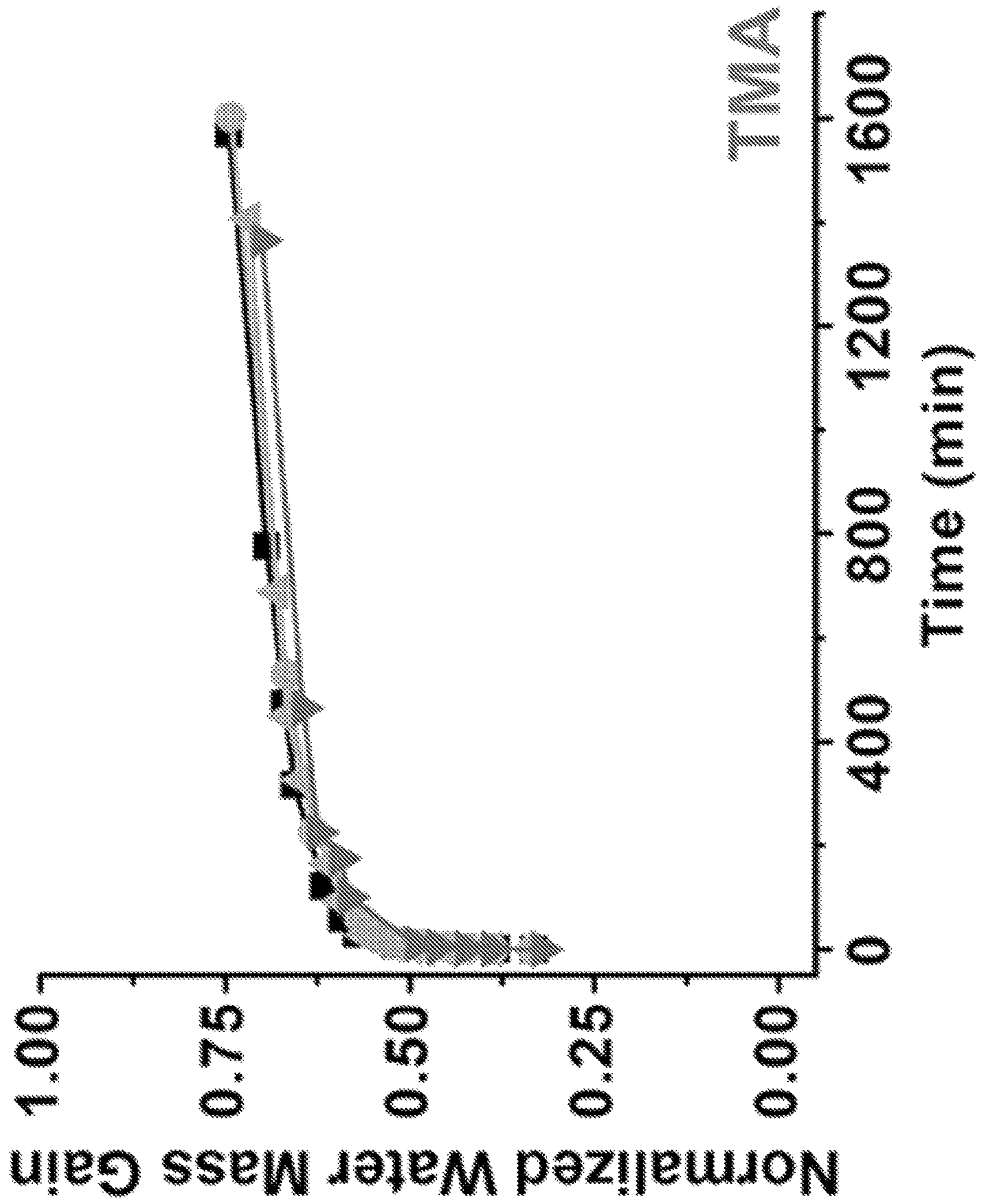

To more directly evaluate water sorption behavior, wood blocks can be fully submerged in water to gravimetrically measure water uptake with time, as described above. FIGS. 7A, 7B, and 7C plot water sorption with time for untreated and 1cy-ALD treated pine blocks using TMA, DEZ, and $TiCl_4$ chemistries, respectively, at varying exposure times. Untreated pine gains 30 weight % water by mass within 30 seconds of submersion (30 s is the first data point in all plots), continues to show appreciable mass gain during the first hour of submersion, and begins to saturate near 75 weight % water mass gain. Neither TMA nor DEZ 1cy-ALD treatments are very effective in reducing water uptake upon submersion relative to the control. FIG. 7B suggests a modest reduction in initial sorption rate for the DEZ treatments, but this reduced sorption rate only lasts for approximately the first ca. 10 minutes. DEZ's decaying hydrophobicity can be partially the result of ZnO dissolving in aqueous environments. In contrast, the $TiCl_4+H_2O$ ALD treatment can impart significant reduction in water sorption. Pine blocks exposed to $TiCl_4$ for 15 and 45 minutes gain only 25 wt % water mass in 24 hours, a 3× reduction relative to the untreated control. Hydrophobicity is especially notable in the 10-minute time scale; untreated pine sorbs 40-50 wt % water while the $TiCl_4$ treated wood only gains 5-10 wt % water by mass. Interestingly, when treated with $TiCl_4$ for 135 minutes, pine blocks can show less resistance to water sorption than the 15 or 45-minute treatments. Without wishing to be bound by any particular scientific theory, short purge times between the two ALD half-cycles can prevent the complete desorption of excess $TiCl_4$ from the wood's porosity, leading to an effective CVD-like deposition of thick, hydrophilic $TiO_2$ coatings within the bulk wood's structure during the $H_2O$ exposure step.

Figure 8:
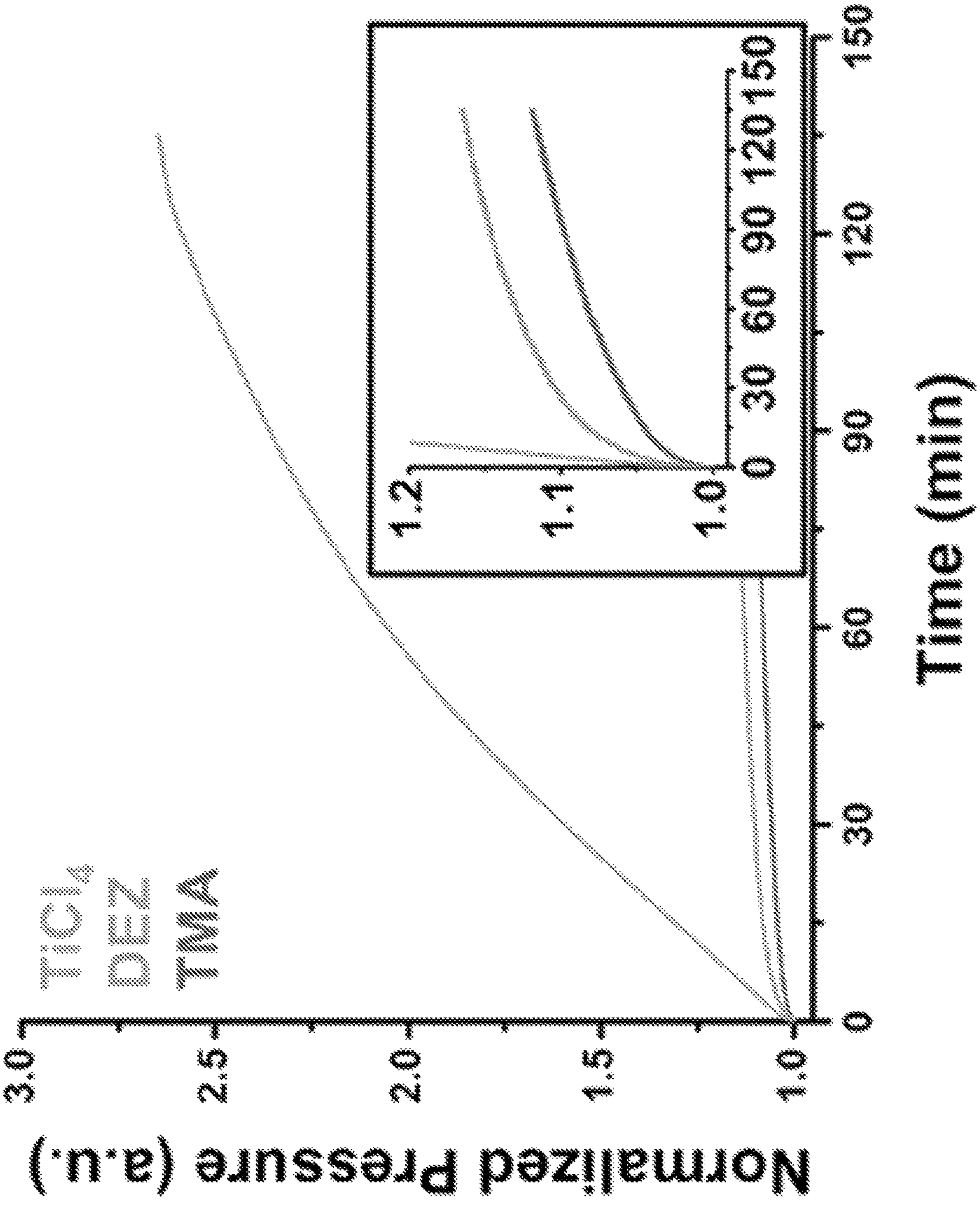
FIG. 8 illustrates a plot of pressure over time for additives deposited onto a cellulosic material in accordance with some embodiments of the present disclosure.

The results above suggest that the $TiCl_4+H_2O$ chemistry can most effectively functionalize the lumber's bulk for water repellency. To provide more physical insight into why $TiCl_4$ behaves differently from DEZ or TMA, pressure profiles from the 1cy-ALD processes are further analyzed. FIG. 8 shows normalized chamber pressures as a function of time for each precursor during the soak step. Here, the increase in chamber pressure can be indicative of byproduct formation and therefore can be used as a proxy to indicate the reaction rate between the precursor and the wood Immediately apparent is the more rapid and linear increase in chamber pressure for the $TiCl_4$ precursor compared to the metal alkyls. This linear increase in byproduct partial pressure for the $TiCl_4$ chemistry can suggest a reaction-limited process, while the square-root-shaped pressure rise of the metal alkyls can suggest a diffusion-limited process. Lastly, we note here that the 1cy-ALD process described herein might not be an ideal, self-limiting, atomic layer deposition process because the pressure profiles do not completely plateau (a plateaued pressure profile would indicate a cessation in reactions). This deviation from ideality can likely be the result of kinetic hindrances and additional chemical reactions.

To further analyze these 1cy-ALD processing kinetics, it can be assumed that the precursors only react with the wood's cellulose and not the other organic constituents (e.g., lignin). This assumption can be reasonable given that lumber is ca. 60% cellulose, and cellulose has a high density of hydroxyl groups that are highly reactive towards these precursors. Secondly, it can also be assumed that the precursors can continue to react with cellulose until all of the ligands dissociate. Lastly, it can further be assumed that only cellulose's hydroxyl groups can react with the precursors, with three hydroxyl groups per cellulose repeat ring (no other side reactions). Subsequently, these latter two stoichiometric assumptions do not alter the functional form of the calculations and thereby do not alter the mechanistic conclusion. However, assuming this stoichiometry, the following reactions can be written for the $TiCl_4$ system (and similarly for the DEZ and TMA systems): 3 $TiCl_4$+4 Cellulose→12 HCl+3 Ti(Cellulose)$_4$ Using these assumptions, a system of linear equations relating the chamber pressure, change in chamber pressure, and molecular stoichiometries can be solved.

Figure 9A:
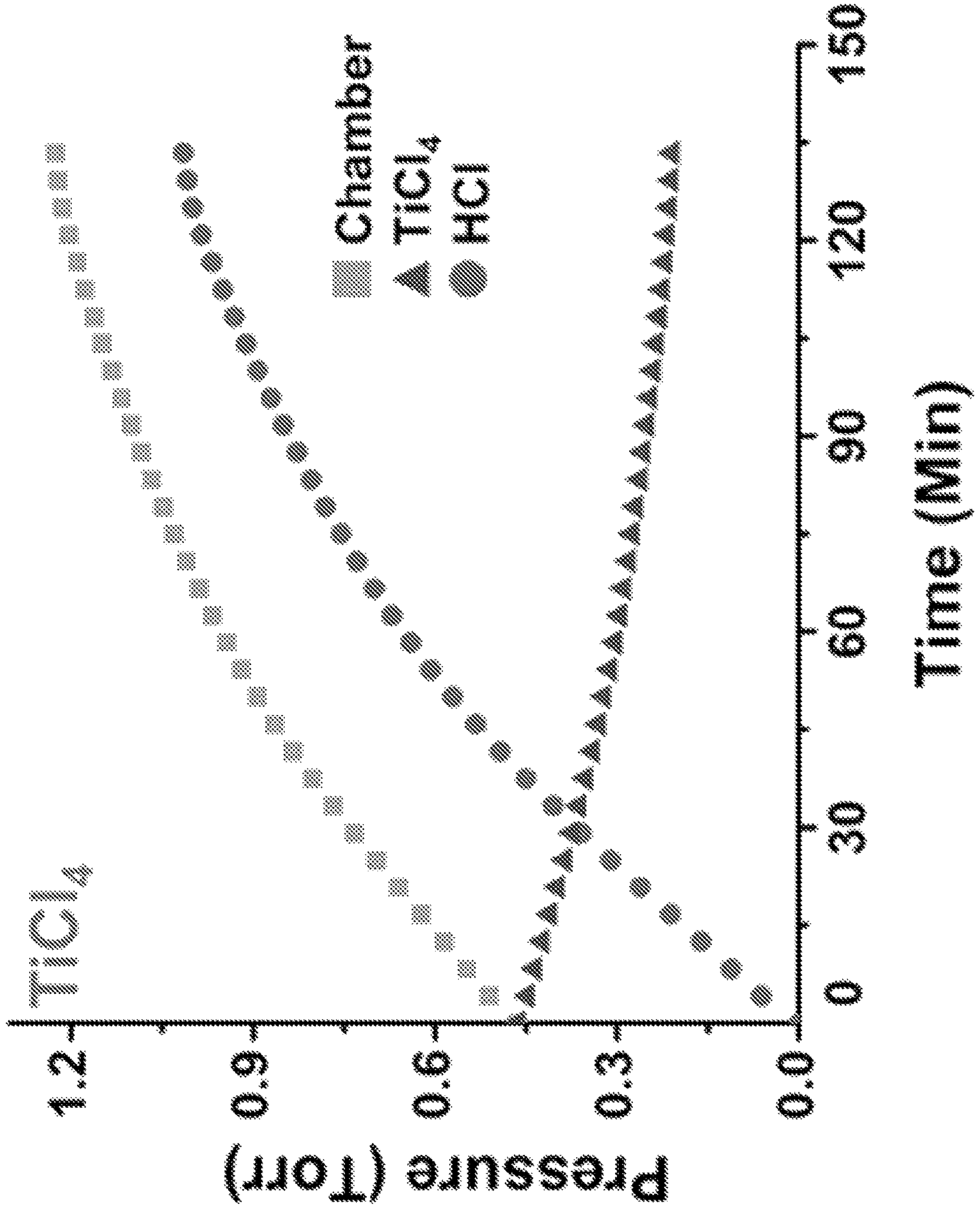
FIGS. 9A, 9B, and 9C illustrate plots of partial pressures over time for a variety of additives in a cellulosic material in accordance with some embodiments of the present disclosure.
Figure 9B:
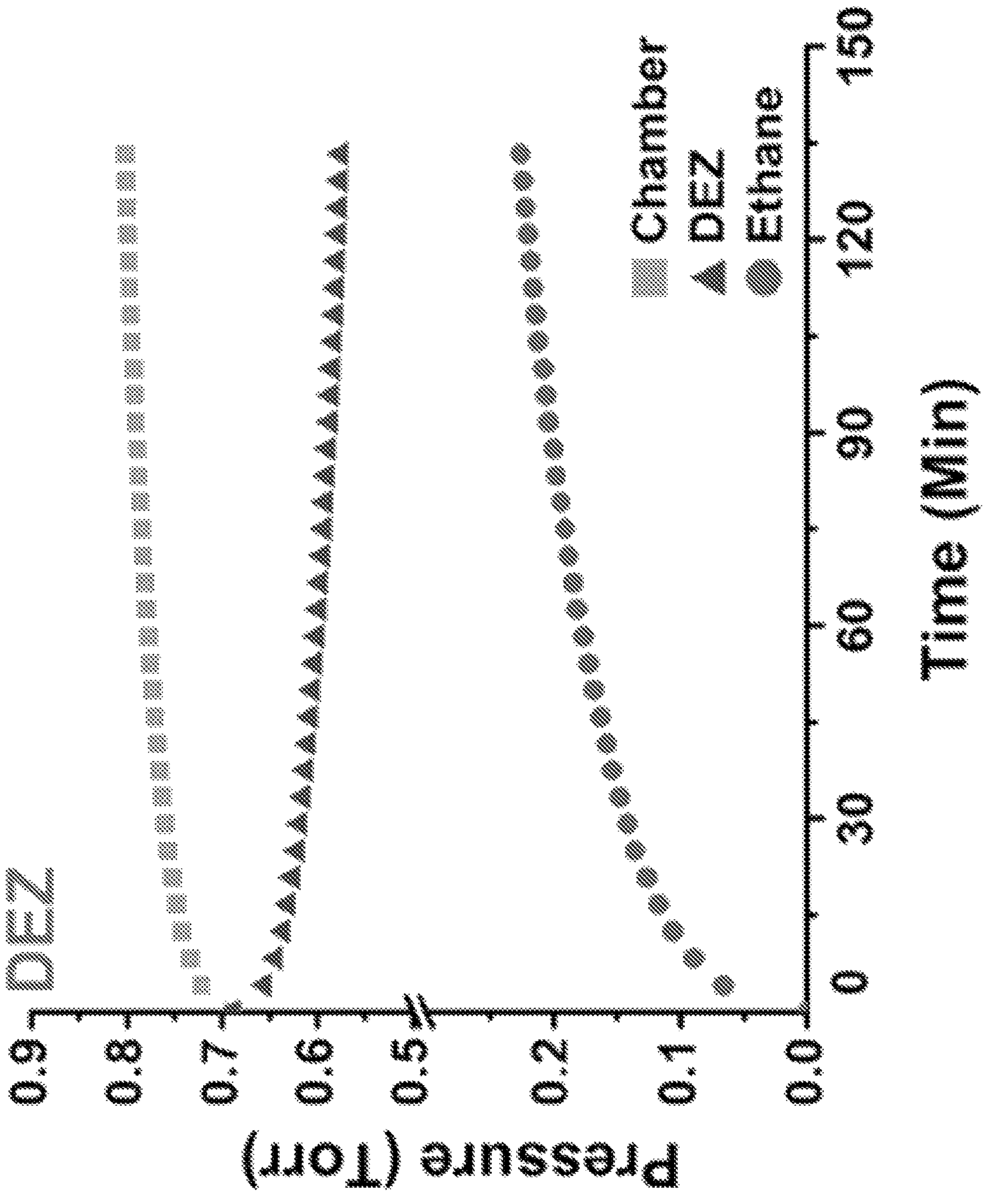
Figure 9C:
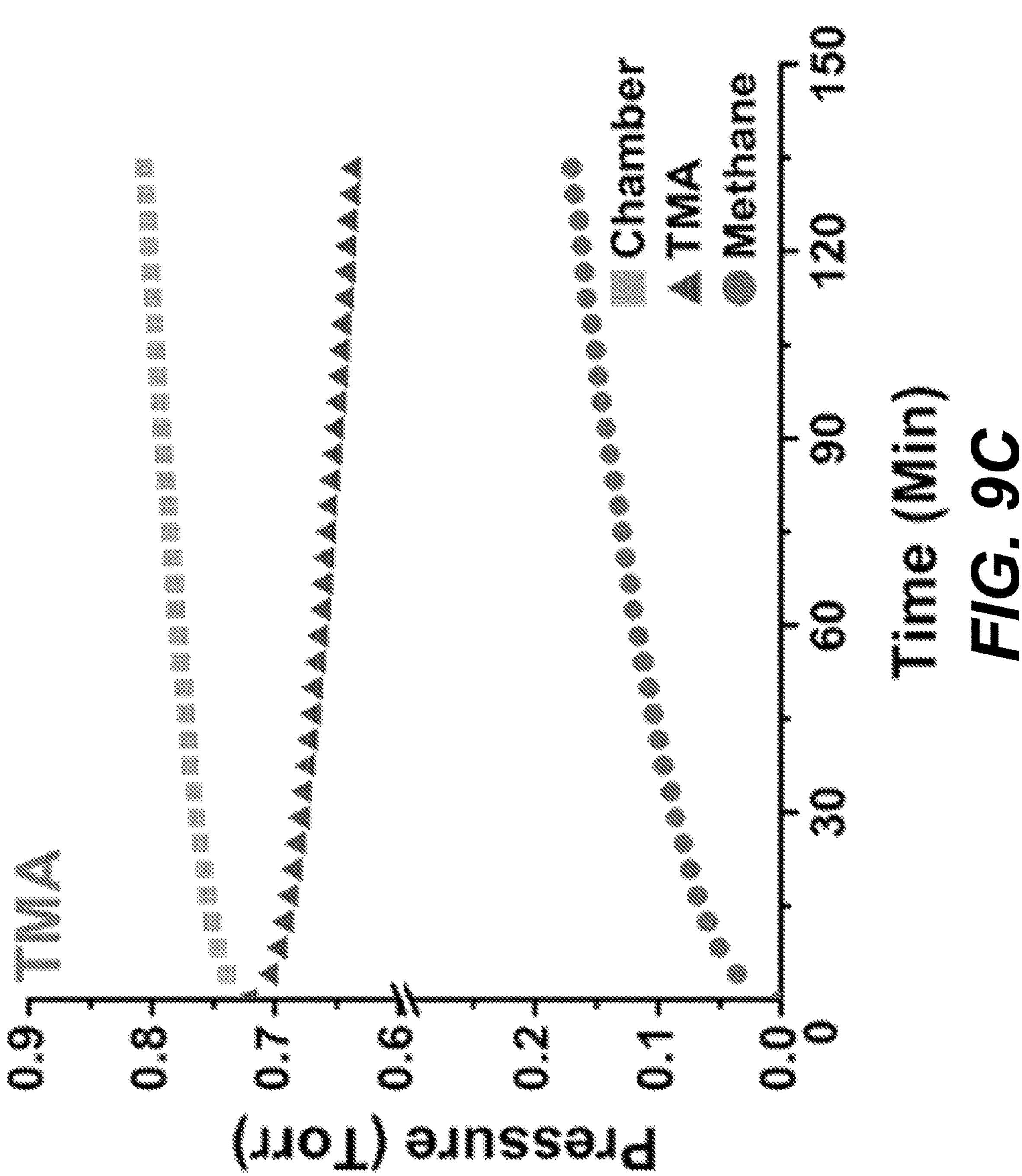

FIGS. 9A, 8B, and 9C plot the calculated partial pressures of the metal containing precursors (triangles) and byproducts (circles) as well as the total measured chamber pressure (squares) as a function of time for each of the chemistries. Precursor and byproduct gas pressures can be calculated by iteratively solving the equations below for all times.

In the $TiCl_4$-lumber reaction, the measured chamber pressure can be solely attributed to the $TiCl_4$ vapor at time t=0 ($P_c(0)$).

$$P_c(0)=P_{TiCl_4} \quad (1)$$

$$P_{HCl}(0)=0 \quad (2)$$

At t=1 second, some $TiCl_4$ can react with some cellulose hydroxyl moieties. Based on the above, the $TiCl_4$, cellulose, and HCl gas stoichiometries can be represented as:

$$3TiCl_4+4Cellulose \rightarrow 12HCl+3Ti(Cellulose)_4$$

Therefore, any decrease in $TiCl_4$ partial pressure can be directly equated to an increase in HCl partial pressure.

$$-\frac{1}{3}dP_{TiCl_4}=\frac{1}{12}dP_{HCl} \quad (3)$$

Additionally, any measured change in chamber pressure can be expressed as the sum of the change in partial pressures:

$$dP_c=dP_{TiCl_4}+dP_{HCl} \quad (4)$$

By combining equations (3) and (4), it can then be derived that:

$$\frac{4}{3}dP_c=dP_{HCl} \quad (5)$$

$$-\frac{1}{3}dP_c=dP_{TiCl_4} \quad (6)$$

Using the initial conditions (1) and (2) and the related rates (5) and (6), the measured chamber pressure from t=0 to t=1 can be written as:

$$dP_c(1)=P_c(1)-P_c(0) \quad (7)$$

$$P_{TiCl_4}(1)=P_{TiCl_4}(0)+\frac{-1}{3}dP_c(1) \quad (8)$$

$$P_{HCl}(1)=P_{HCl}(0)+\frac{4}{3}dP_c(1) \quad (9)$$

$$P_c(1)=P_{TiCl_4}(1)+P_{HCl}(1) \quad (10)$$

The stoichiometric rations can determine the magnitude of the model product gases, while the functional form of the model product gases can be dictated by the functional form of the measure chamber gas pressure curve. In other words, the mechanistic behavior can be constant and independent of the assumed stoichiometries, but the kinetic coefficients can be dependent on the assumed stoichiometries.

The functional form of the byproduct's partial pressure can follow the chamber's total pressure regardless of the reaction stoichiometries assumed; these stoichiometries only serve to linearly scale the magnitude of the byproduct's partial pressure. Because the functional form of the byproduct's generation rate is effectively fixed regardless of assumed reaction stoichiometry, this functional form can be used to assign a process mechanism. For both TMA and DEZ, the calculated byproduct partial pressure can be a square-root dependence; plots are linear when plotted versus the root of time. In contrast, the byproducts generated during the $TiCl_4$ process initially exhibit a linear increase in partial pressure with time up to ca. 64 min Beyond 64 min, the byproduct's partial pressure transitions to a root dependence with time. Without wishing to be bound by any particular scientific theory, the root dependency observed for metal alkyl precursors can indicate gas diffusion-limited rate kinetics while the linear dependence of the halide precursors indicates reaction-limited rate kinetics. Recall here, the wood structure can have a significant porosity that can create a tortuous path for vapor phase precursor and byproduct transport, similar to high aspect ratio structures. Thus, similar assignments can be made for 1cy-ALD processing on wood: the $TiCl_4$ chemistry can follow a reaction-limited process while the TMA and DEZ chemistries follow a diffusion-limited process.

Differences in the rate-limiting step can be likely due to differences in the activation barriers to reaction rather than differences in the precursors' gas diffusion rates. At a process pressure of ca. 0.7 Torr the vapor molecules' mean free path is ca. 35 μm, and gas diffusion within the wood's capillaries (ca. 30 μm characteristic diameter) can occur via molecular flow. The volumetric flow rate (conductance, C) for molecular flow into a capillary is given by:

$$C=\alpha d^2\sqrt{\frac{\pi RT}{32M}} \quad (11)$$

where d is the pore diameter, R is the universal gas constant, T is absolute temperature, M is the molecule's molar mass, and a is a geometric term for the transmission probability. Because process temperature can be constant, capillary geometry can remain unchanged, and the contribution to conductance due to precursor molecular weight can vary by less than 20%, the gas transport rates through the capillaries can be similar for all three precursor chemistries. Consequently, the slower processing dynamics of DEZ and TMA can represent faster reaction kinetics between these precursors and the cellulosic material and not an inherently slower gas diffusion rate.

Figure 10A:
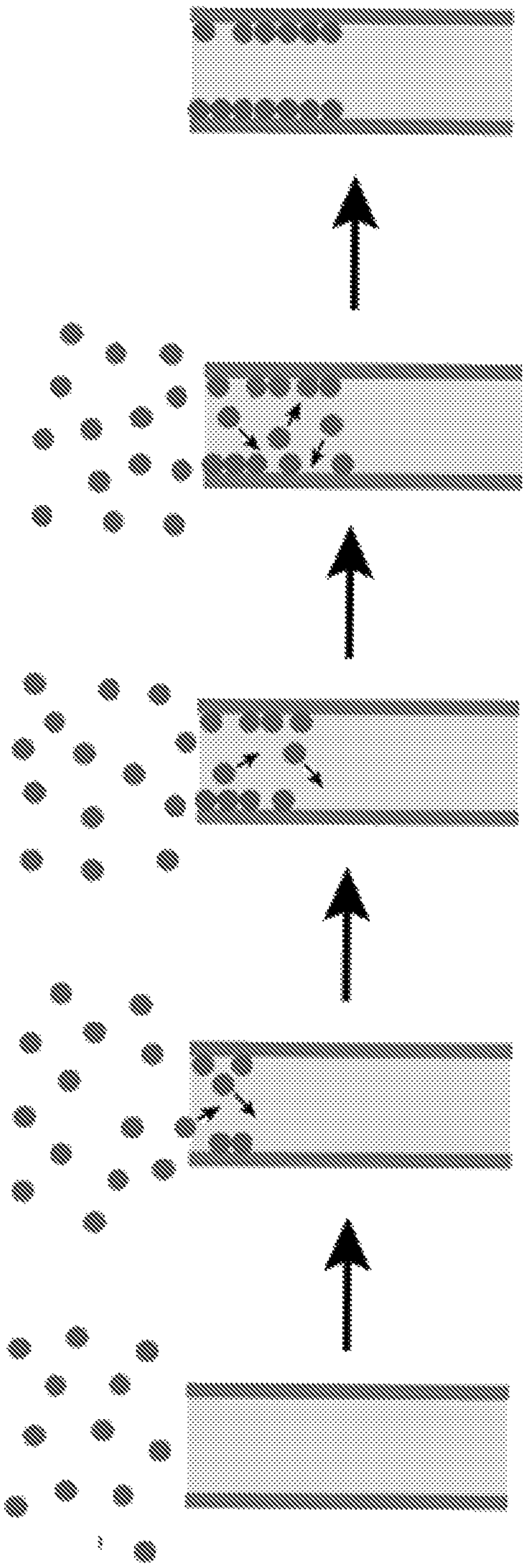
FIG. 10A illustrates an additive in a cellulosic material being diffusion limited in accordance with some embodiments of the present disclosure.
Figure 10B:
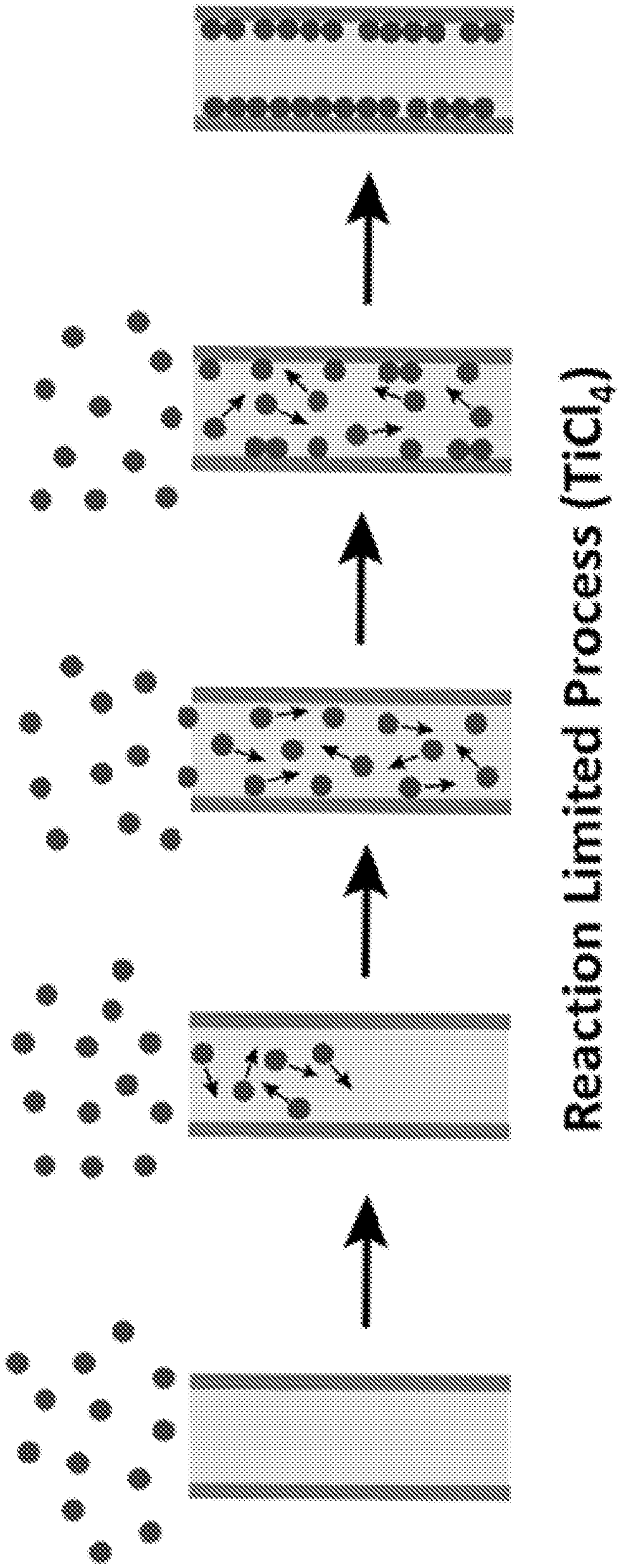
FIG. 10B illustrates an additive in a cellulosic material being reaction limited in accordance with some embodiments of the present disclosure.

The faster reaction kinetics can lead to slower intrusion of TMA and DEZ down the length of the capillaries. Upon impingement with the capillary walls, these precursors can have a higher likelihood of reacting. These reactions can consume the precursors before they can diffuse further down the length of the capillary, effectively slowing the diffusion rate. Eventually the length required for entering precursors to diffuse prior to reacting can become sufficiently long that the process rate slows, as shown in FIG. 10A. In contrast, $TiCl_4$ precursors can have a lower likelihood of reaction with the capillary walls, leading to multiple adsorption and desorption events with the walls prior to reaction. This lower reactivity can lead to a "filling" of the capillaries with the $TiCl_4$ precursor. This high overpressure of $TiCl_4$ within the pores can drive a reaction-limited linear process rate until the pore structure is fully coated, as shown in FIG. 10B. At the 100° C. process temperature described above, this coating saturation appears to occur at ca. 64 min when the 1cy-ALD $TiCl_4$ process changes from a reaction-limited mechanism to a diffusion-limited mechanism. For long precursor soak times, the short pump-purge step (10 min total) used herein can be insufficient to completely remove all of the $TiCl_4$ from the wood's capillaries. This trapped $TiCl_4$ can then react with the water dose in a CVD-like manner leading to increased $TiO_2$ deposition, Additionally, the CVD-like deposition (opposed to ALD-like deposition) can also be plausible at increased infiltration times and capillary depths if the initial vacuum drying did not fully remove deep surface adsorbed water molecules. These water molecules would not markedly affect the functional form of the reaction kinetics observed in this study (analogous to the ligand disassociation discussion above) but could affect deposition rates and surface properties.

Figure 11A:
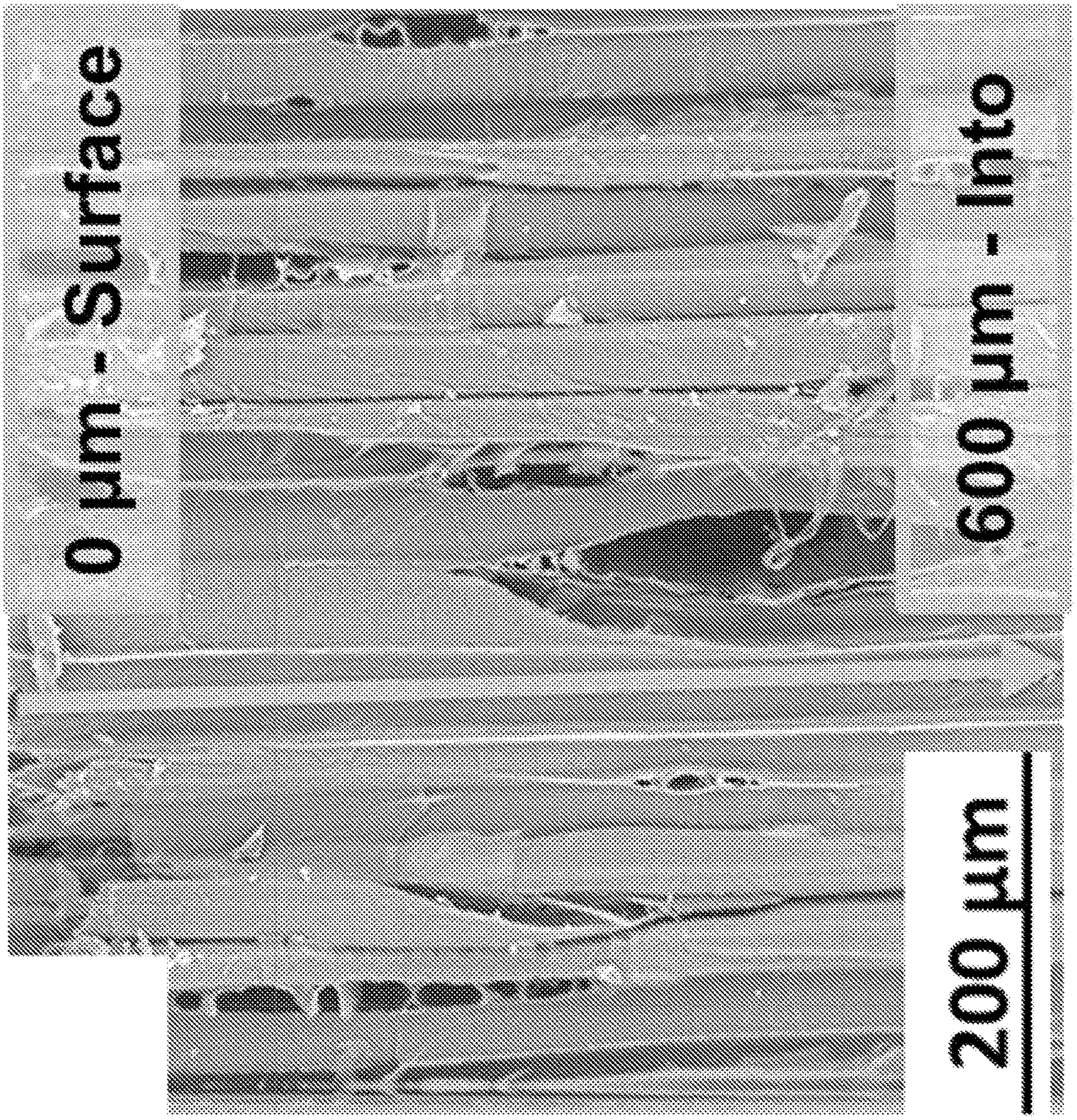
FIG. 11A illustrates a scanning electron microscope (SEM) image of a cellulosic material having an additive in accordance with some examples of the present disclosure.
Figure 11B:
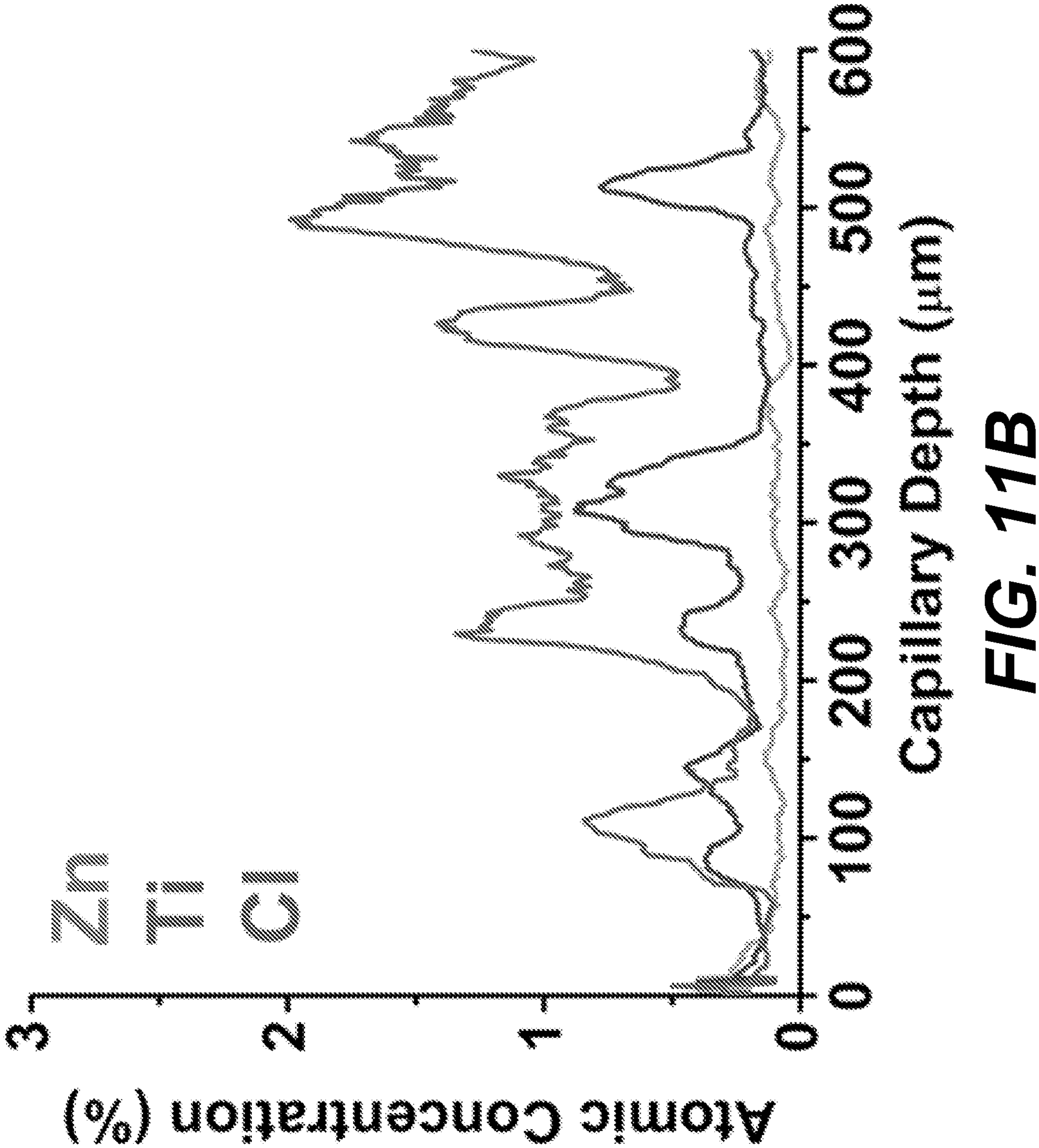
FIG. 11B illustrates a plot of capillary depth for a variety of cellulosic materials and a variety of additives in accordance with some embodiments of the present disclosure.

To further verify the phenomenological hypothesis that metal alkyl precursors can be diffusion-limited while metal halides can be reaction-limited, EDX line profiles can be collected along the depth of the wood's capillary walls, as shown in FIG. 11A. FIG. 11B shows elemental line scans as a function of capillary depth for the 1cy-ALD $TiCl_4$+$H_2O$ and 1cy-ALD DEZ+$H_2O$ treatments. The noise in the EDX signal is likely due to complications with the wood's heterogeneity, non-uniform microstructure, and electrically insulating character. While Zn is readily detected near the surface of 1cy-ALD DEZ+$H_2O$ treated wood, this Zn signal decays rapidly beyond the first ca. 40 μm (the Zn signal is possibly just noise thereafter), In contrast, the Ti and Cl signals in the 1cy-ALD $TiCl_4$+$H_2O$ treated wood can be detected to at least 0.6 mm and likely farther. The abundance of Ti/Cl peaks deep in the lumber capillaries supports the proposed mechanism of greater infiltration for the $TiCl_4$+$H_2O$ process. The abundance of detected Cl also suggests reaction and/or entrapment of the HCl byproduct within the wood rather than efficient removal.

Figure 12:
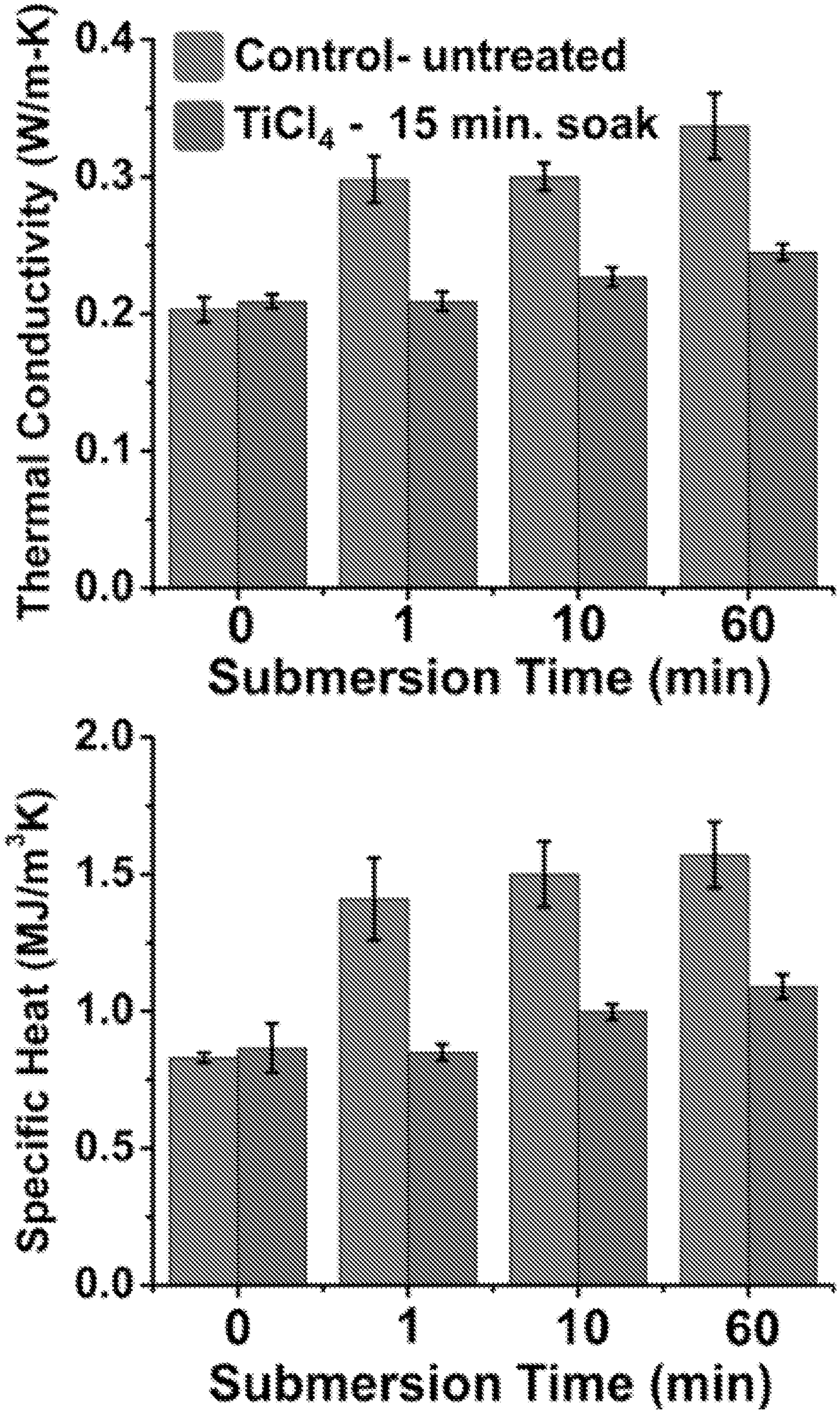
FIG. 12 illustrates a plot of the thermal conductivity and the specific heat of a cellulosic material with an additive in accordance with some embodiments of the present disclosure.

In the built environment, lumber studs are often the highest thermal conductivity component in an external wall, reducing the overall thermal insulation of the building. Absorbed water is known to contribute to the wood's thermal conductivity. Here, the disclosed technology can tune how the hydrophobic nature of 1cy-ALD modified wood impacts its thermal conductivity. The most extreme cases can be compared: untreated pine and 1cy-ALD coated pine using the $TiCl_4$+$H_2O$ chemistry with a 15 min exposure time. FIG. 12 summarizes the thermal properties of these two materials in the dry state and after various water submersion times. Thermal conductivities and specific heats are similar for both dry wood blocks (0.21 W/m-K and 0.83 MJ/$m^3$-K) and consistent with reported values. Upon immersion, the thermal conductivity of untreated pine increases by 40% (0.30 W/m-K) within 1 minute and becomes 62% higher within 60 minutes (0.34 W/m-K). For reference, the water mass gain of control wood within 1 minute is 35 weight %, and within 60 minutes is 60 wt %. Note that many pine species gain ca. 25 weight % water mass in humid atmospheric conditions, so the water mass gain in the 1-minute submersion trial is a realistic condition for wet climates. The increased thermal conductivity of the untreated pine blocks is likely the result of absorbed water. In contrast, the ALD treated wood thermal conductivity is nearly unchanged after 1 minute of submersion (0.21 W/m-K) and increases by only 15% (0.24 W/m-K) after 1 hour of submersion (ca. 8% mass gain). Consequently, after 1 min of submersion (equivalent to a humid environment), the 1cy-ALD treated pine has a 30% lower thermal conductivity than the untreated pine.

The increased hydrophobicity and thermal resistivity of $TiCl_4$ treated lumber presents opportunities for cost and energy savings. 10% of US residential energy consumption (ca. 0.8 quads or 6 million BTU/dwelling) is lost to thermal bridging through wall studs. Assuming a 1cy-ALD treated pine could lower the thermal conductivity of a residential stud by 30%, newly constructed residential homes could save ca. 2 million BTU/dwelling/year. These approximations underestimate the thermal losses caused by other wood-based construction materials like particle board and plywood that can also be improved with these same treatments.

Figure 13:
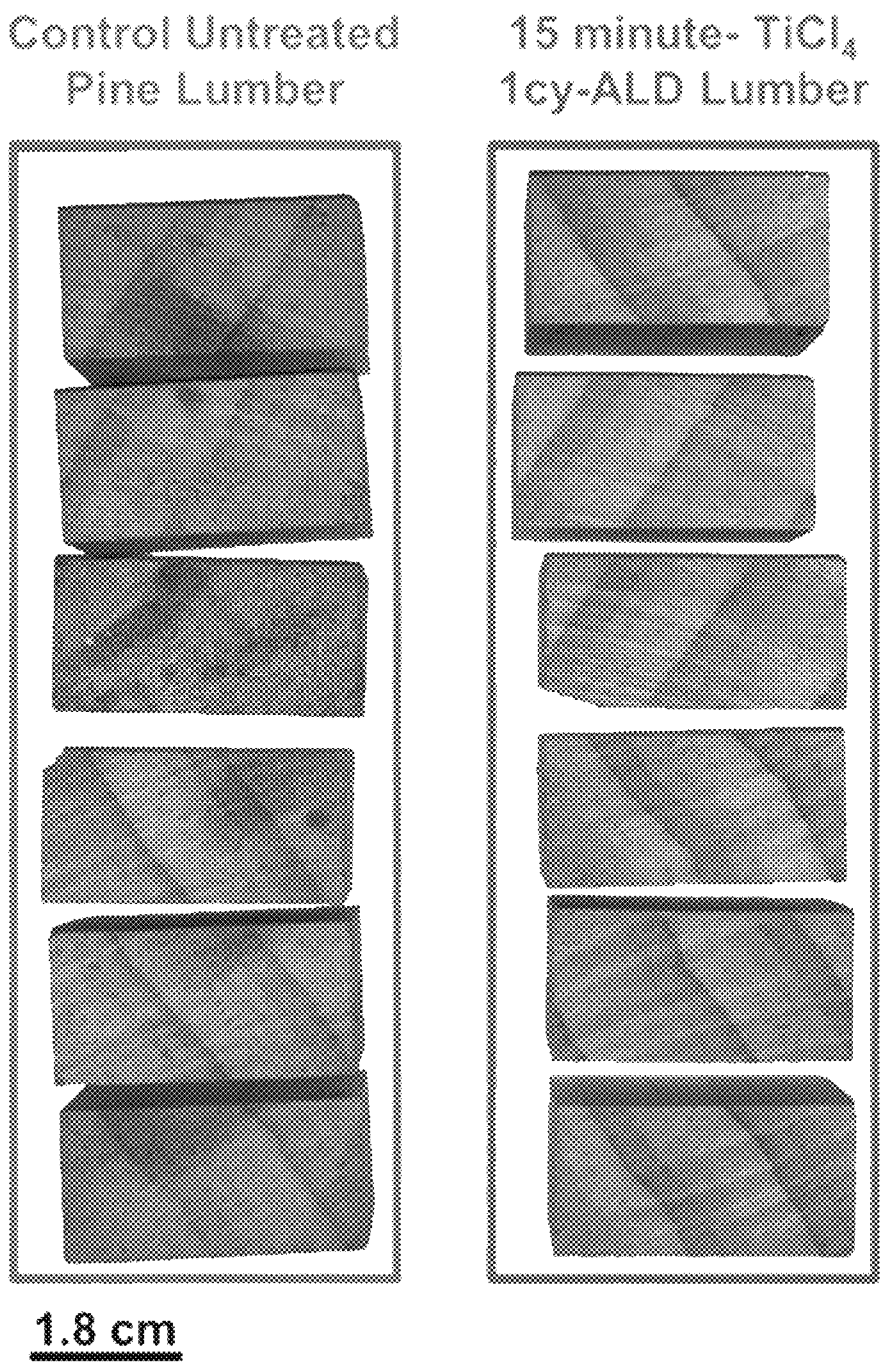
FIG. 13 illustrates photographs of cellulosic material having an additive after exposure to water for an extended period of time in accordance with some embodiments of the present disclosure.

Hydrated lumber is also susceptible to the growth of bacteria, fungi, and molds. Uncontrolled growth of these undesirable organisms on lumber used in building construction can both compromise the structural integrity of the wood and pose a threat to human health. For example, approximately 20% of U.S. respiratory ailments can be attributed to dampness and mold in homes. To mitigate mold and pesticide proliferation, lumber can be pressure treated with fungicides. Pressure treatment involves soaking lumber in pressurized baths containing a copper complex, but this treatment is environmentally hazardous and the treated lumber poses toxicity risks. FIG. 13 shows the lumber pieces six months after full water immersion for 60 min. The 1cy-ALD (15 min) $TiO_2$ treated pine blocks show no evidence of mold growth while untreated pine blocks have developed significant green-black mold growth. Additionally, the $TiCl_4$ treated blocks can remain still mold-free and hydrophobic one year later. The ALD treatment's mitigation of water sorption can be a primary factor in preventing mold growth, although other chemical mechanisms due to the change in surface chemistry can also be contributing to this antifungal property.

What is claimed is:

1. A method comprising:

permeating a first additive into cellulosic material, the first additive being in a vapor phase and configured to react with one or more functional groups of the cellulosic material;

adsorbing the first additive into one or more capillaries of the cellulosic material; and permeating a second additive into the cellulosic material, the second additive being in a vapor phase and configured to seal one or more of the capillaries by adsorbing onto one or more of the functional groups;

wherein the first additive is configured to modify at least one property of the cellulosic material.

2. The method of claim 1, wherein:

permeating the first additive comprises atomic layer deposition (ALD) of the first additive into the cellulosic material; and the ALD comprises from 1 to 50 deposition cycles.

3. The method of claim 1, wherein:

one or more of the functional groups comprises a nucleophile; and the first additive is configured to react with the nucleophile.

4. The method of claim 1, wherein:

the cellulosic material is selected from the group consisting of wood lumber, engineered wood product, natural wood products, plastic lumber, engineered composites, plywood, sawdust board, particle board, sawdust, wood chips, wood strands, hardwood, and softwood; and one property of the cellulosic material is selected from the group consisting of hydrophobicity, thermal conductivity, thermal diffusivity, fungo-toxicity, toxicity, wettability, tensile strength, biodegradability, bio-toxicity, corrosiveness, and swelling.

5. The method of claim 1, wherein the first additive comprises a metal oxide.

6. The method of claim 1, wherein permeating the first additive and permeating the second additive comprises ALD of the first additive and the second additive into the cellulosic material, respectively.

7. The method of claim 6, wherein the ALD comprises from 1 to 50 deposition cycles.

8. The method of claim 1, wherein:

one or more of the functional groups comprises a nucleophile; and at least one of the first additive or the second additive is configured to react with the nucleophile.

9. The method of claim 1, wherein:

the first additive comprises a metal oxide; and the second additive comprises a polymer.

10. The method of claim 1, wherein the first additive is configured to make the cellulosic material hydrophobic and anti-fungal.

11. The method of claim 1, wherein:

the cellulosic material further has reactive surface sites;

permeating the first additive comprises ALD of the first additive into the cellulosic material; and the first additive comprises a precursor that chemically binds to the reactive surface sites.

12. The method of claim 11, wherein:

permeating the first additive comprises a single cycle ALD process of exposing the cellulosic material to a gas phase of the precursor being a metal-containing precursor; and the second additive is an oxidant to provide an atomic-scale inorganic surface coating of less than 5 nm to the cellulosic material.

13. The method of claim 11 further comprising introducing a co-reactant to the cellulosic material to either oxidize or reduce the precursor and re-activate the reactive surface sites.

14. The method of claim 13, wherein the ALD occurs after the introducing.

15. The method of claim 11, wherein each ALD deposits about 1 Å of the precursor.

16. Vapor phase processing for modifying external and internal surface porosities of cellulosic material comprising:

permeating a first additive into the cellulosic material, the first additive being in a vapor phase and configured to react with one or more functional groups of the cellulosic material;

adsorbing the first additive into one or more capillaries of the cellulosic material; and permeating a second additive into the cellulosic material, the second additive being in a vapor phase and configured to seal one or more of the capillaries by adsorbing onto one or more of the functional groups;

wherein:

permeating the first additive comprises a single cycle atomic layer deposition (ALD) process of exposing the cellulosic material to a gas phase metal-containing precursor;

the second additive is an oxidant;

the steps of permeating, adsorbing and permeating form a coating of less than 5 nm; and the coating is configured to provide the cellulosic material with hydrophobicity, water repellency, and anti-fungal properties.

17. The vapor phase processing of claim 16, wherein the exposing enables penetration of the coating within a depth of the cellulosic material.

18. A method of modifying one or more properties of a cellulosic material having one or more capillaries and one or more functional groups comprising:

permeating a first additive into cellulosic material, the first additive being in a vapor phase and configured to react with one or more of the functional groups;

adsorbing the first additive into one or more of the capillaries; and permeating a second additive into the cellulosic material, the second additive being in a vapor phase and configured to seal one or more of the capillaries by adsorbing into one or more of the functional groups.

19. The method of claim 18, wherein at least one of:

the first additive comprises a metal oxide;

the second additive comprises a polymer;

permeating the first additive and permeating the second additive comprises atomic layer deposition (ALD) of the first additive and the second additive into the cellulosic material, respectively; or one or more of the functional groups comprises a nucleophile and at least one of the first additive or the second additive is configured to react with the nucleophile.

* * * * *